US012695170B2

(12) United States Patent
Robinson et al.

(10) Patent No.: US 12,695,170 B2
(45) Date of Patent: *Jul. 28, 2026

(54) SYSTEMS OF WIRELESS COMMUNICATION-ENABLED INTEGRATED ROOFING ACCESSORIES AND METHODS OF USE THEREOF

(71) Applicant: BMIC LLC, Dallas, TX (US)

(72) Inventors: Rich Robinson, Round Rock, TX (US); Xavier Riley, San Jose, CA (US)

(73) Assignee: BMIC LLC, Dallas, TX (US)

( * ) Notice: Subject to any disclaimer, the term of this patent is extended or adjusted under 35 U.S.C. 154(b) by 129 days.

This patent is subject to a terminal disclaimer.

(21) Appl. No.: 18/774,600

(22) Filed: Jul. 16, 2024

(65) Prior Publication Data

US 2024/0387976 A1 Nov. 21, 2024

Related U.S. Application Data

(63) Continuation of application No. 18/298,087, filed on Apr. 10, 2023, now Pat. No. 12,095,139, which is a (Continued)

(51) Int. Cl.
*H01Q 1/22* (2006.01)
*H01Q 21/06* (2006.01)
*H01Q 21/28* (2006.01)

(52) U.S. Cl.
CPC ............ *H01Q 1/22* (2013.01); *H01Q 21/065* (2013.01); *H01Q 21/28* (2013.01)

(58) Field of Classification Search
CPC ......... H01Q 1/22; H01Q 21/065; H01Q 21/28
See application file for complete search history.

(56) References Cited

U.S. PATENT DOCUMENTS 9,871,287 B2 1/2018 Achour
11,375,561 B2 6/2022 Labadie
(Continued)

FOREIGN PATENT DOCUMENTS

CN 108880638 A 11/2018
JP 2017-143336 A 8/2017
KR 10-2019-0096021 A 8/2019

*Primary Examiner* — Graham P Smith
(74) *Attorney, Agent, or Firm* — GREENBERG TRAURIG, LLP

(57) ABSTRACT

In some embodiments, the present disclosure provides a system of integrated roofing accessories on a plurality of roofs, where at least one integrated roofing accessory on each roof may include: i) at least one transceiver configured to produce electromagnetic communication signals using electromagnetic communication protocols, ii) at least one dielectric antenna in electrical communication with the at least one transceiver for emitting the electromagnetic communication signals according to the at least one electromagnetic communication protocol, iii) an edge computing device having at least one processor and at least one non-transitory storage with software to operate the edge computing device in communication with the at least one transceiver, and iv) at least one power supply. The software is configured to cause, when executed, the integrated roofing accessories to form an electromagnetic communication network using the electromagnetic communication signals which communicates with at least one computing device.

20 Claims, 7 Drawing Sheets

Related U.S. Application Data continuation of application No. 17/821,127, filed on Aug. 19, 2022, now Pat. No. 11,626,656, which is a continuation of application No. 17/162,750, filed on Jan. 29, 2021, now Pat. No. 11,444,368, which is a continuation of application No. 17/013,468, filed on Sep. 4, 2020, now Pat. No. 10,910,693.

(60) Provisional application No. 62/895,855, filed on Sep. 4, 2019.

(56) References Cited

U.S. PATENT DOCUMENTS

| | | | | |
|---|---|---|---|---|
| 11,394,344 | B2 | 7/2022 | Perkins | |
| 11,496,921 | B1 | 11/2022 | Campau | |
| 12,087,997 | B2 | 9/2024 | Brown | |
| 12,190,275 | B2 | 1/2025 | Robinson | |
| 2013/0193769 | A1 | 8/2013 | Mehta et al. | |
| 2014/0260000 | A1 | 9/2014 | Haynes et al. | |
| 2015/0180114 | A1 | 6/2015 | Achour | |
| 2018/0331413 | A1 | 11/2018 | Adriazola et al. | |
| 2018/0331720 | A1 | 11/2018 | Adriazola et al. | |
| 2018/0343685 | A1 | 11/2018 | Hart et al. | |
| 2018/0375199 | A1 | 12/2018 | Papp et al. | |
| 2019/0067792 | A1 | 2/2019 | Au | |
| 2020/0185818 | A1 | 6/2020 | Kim et al. | |
| 2020/0374980 | A1* | 11/2020 | Zimmerman, III ... | H04W 16/26 |
| 2025/0086569 | A1 | 3/2025 | Robinson | |

* cited by examiner

SYSTEMS OF WIRELESS COMMUNICATION-ENABLED INTEGRATED ROOFING ACCESSORIES AND METHODS OF USE THEREOF

CROSS-REFERENCE TO RELATED APPLICATIONS

This application claims priority to U.S. patent application Ser. No. 17/162,750, filed Jan. 29, 2021, U.S. patent application Ser. No. 17/013,468, filed Sep. 4, 2020, now U.S. Pat. No. 10,910,693, issued on Feb. 2, 2021, which claims priority to U.S. Provisional Application 62/895,855, filed on Sep. 4, 2019 and entitled "INTEGRATED ROOFING SHINGLES", and is herein incorporated by reference in its entirety.

FIELD OF TECHNOLOGY

The field of the present disclosure relates to integrated roofing accessories, including integrated shingles and other suitable roofing accessories.

BACKGROUND OF THE TECHNOLOGY

Typically, traditional wireless/cellular/over-air deployments may be difficult to implement at scale. Due to the frequencies required to deliver on network speeds and reduce latency, signal propagation suffers.

SUMMARY OF THE DISCLOSURE

In some aspects, the techniques described herein relate to a system including: at least one first integrated roofing accessory installed on a first roof, wherein the at least one first integrated roofing accessory includes: i) at least one first transceiver configured to produce electromagnetic communication signals using at least one electromagnetic communication protocol, ii) at least one first dielectric antenna in electrical communication with the at least one first transceiver for emitting the electromagnetic communication signals according to the at least one electromagnetic communication protocol, iii) a first edge computing device having at least one first processor and at least one first non-transitory storage with first software to operate the first edge computing device in communication with the at least one first transceiver, and iv) at least one first power supply; at least one second integrated roofing accessory installed on a second roof, wherein the at least one second integrated roofing accessory includes: i) at least one second transceiver configured to produce the electromagnetic communication signals using the at least one electromagnetic communication protocol, ii) at least one second dielectric antenna in electrical communication with the at least one second transceiver for emitting the electromagnetic communication signals according to the at least one electromagnetic communication protocol, iii) a second edge computing device having at least one second processor and at least one second non-transitory storage with second software to operate the second edge computing device in communication with the at least one second transceiver, and iv) at least one second power supply; at least one third integrated roofing accessory installed on a third roof, wherein the at least one third integrated roofing accessory includes: i) at least one third transceiver configured to produce the electromagnetic communication signals using the at least one electromagnetic communication protocol, ii) at least one third dielectric antenna in electrical communication with the at least one third transceiver for emitting the electromagnetic communication signals according to the at least one electromagnetic communication protocol, iii) a third edge computing device having at least one third processor and at least one third non-transitory storage with third software configured to operate the third edge computing device in communication with the at least one third transceiver, and iv) at least one third power supply; wherein the first software, the second software and the third software are configured to cause, when executed, the at least one first integrated roofing accessory, the at least one second integrated roofing accessory and the at least one third integrated roofing accessory to form an electromagnetic communication network using the electromagnetic communication signals; and wherein at least one of the first software, the second software, and the third software are further configured to cause, when executed, the electromagnetic communication network to communicate with at least one computing device.

In some aspects, the techniques described herein relate to a system, wherein at least one of the at least one first integrated roofing accessory, the at least one second integrated roofing accessory, or the at least one third integrated roofing accessory is integrated into at least one modified photovoltaic module.

In some aspects, the techniques described herein relate to a system, wherein the at least one modified photovoltaic module includes at least one photovoltaic panel.

In some aspects, the techniques described herein relate to a system, wherein at least one of the at least one first transceiver, the at least one second transceiver, or the at least one third transceiver includes a software-defined radio module.

In some aspects, the techniques described herein relate to a system, wherein the software-defined radio module includes a virtual firewall.

In some aspects, the techniques described herein relate to a system, wherein the electromagnetic communication network is defined according to an Open Systems Interconnection (OSI) model.

In some aspects, the techniques described herein relate to a system, wherein the at least one first integrated roofing accessory further includes: a compartment, holding: i) the at least one first transceiver, ii) the at least one first dielectric antenna, and iii) the at least one first edge computing device; wherein a portion of the compartment includes a roofing material; and a frame connected to the compartment and to the first roof.

In some aspects, the techniques described herein relate to a system, wherein the compartment extends vertically above the first roof.

In some aspects, the techniques described herein relate to a system, wherein the frame is installed into a ridge vent of the first roof.

In some aspects, the techniques described herein relate to a system, wherein the at least one first integrated roofing accessory further includes: a shingle, holding: i) the at least one first transceiver, ii) the at least one first dielectric antenna, and iii) the at least one first edge computing device.

In some aspects, the techniques described herein relate to a system, wherein the at least one first dielectric antenna is a plurality of first dielectric antennas.

In some aspects, the techniques described herein relate to a system, wherein the at least one first integrated roofing accessory further includes: a siding, holding: i) the at least one first transceiver, ii) the at least one first dielectric antenna, and iii) the at least one first edge computing device.

In some aspects, the techniques described herein relate to a system, wherein at least one of the first software, the second software, or the third software are further configured to cause, when executed, the electromagnetic communication network to communicate with at least one customer access radio enabled computing device.

In some aspects, the techniques described herein relate to a system, wherein the customer access radio enabled device includes a WiFi communication module.

In some aspects, the techniques described herein relate to a system: wherein the at least one first integrated roofing accessory includes a first data storage device and a first compute device; wherein the at least one second integrated roofing accessory includes a second data storage device and a second compute device; wherein the at least one third integrated roofing accessory includes a third data storage device and a third compute device; and wherein the first software, the second software and the third software are configured to cause, when executed, the at least one first integrated roofing accessory, the at least one second integrated roofing accessory and third the plurality of integrated roofing accessories to form a distributed datacenter across the electromagnetic communication network.

In some aspects, the techniques described herein relate to a system, further including a fiber optic connection between a backhaul network and at least one of the at least one first integrated roofing accessory, the at least one second integrated roofing accessory, or the at least one third integrated roofing accessory.

In some aspects, the techniques described herein relate to a system, wherein the electromagnetic communication network is a mesh network.

In some aspects, the techniques described herein relate to a system, wherein the electromagnetic communication protocol includes at least one of: a fifth-generation cellular (5G) protocol, a fourth-generation cellular (4G) protocol, a third-generation cellular (3G) protocol, a WiFi protocol, a Bluetooth protocol, a Zigbee protocol, or a Z-Wave protocol.

In some aspects, the techniques described herein relate to a method including: obtaining a at least one first integrated roofing accessory, including: i) at least one first transceiver configured to produce electromagnetic communication signals using at least one electromagnetic communication protocol, ii) at least one first dielectric antenna in electrical communication with the at least one first transceiver for emitting the electromagnetic communication signals according to the at least one electromagnetic communication protocol, and iii) a first edge computing device having at least one first processor and at least one first non-transitory storage with software; mounting the at least one first integrated roofing accessory on a first roof; obtaining at least one second integrated roofing accessory, including: i) at least one second transceiver configured to produce the electromagnetic communication signals using the at least one electromagnetic communication protocol, ii) at least one second dielectric antenna in electrical communication with the at least one second transceiver for emitting the electromagnetic communication signals according to the at least one electromagnetic communication protocol, and iii) a second edge computing device having at least one second processor and at least one second non-transitory storage with software; mounting the at least one second integrated roofing accessory on a second roof; obtaining at least one third integrated roofing accessory, including: i) at least one third transceiver configured to produce the electromagnetic communication signals using the at least one electromagnetic communication protocol, ii) at least one third dielectric antenna in electrical communication with the at least one third transceiver for emitting the electromagnetic communication signals according to the at least one electromagnetic communication protocol, and iii) a third edge computing device having at least one third processor and at least one third non-transitory storage with software; mounting the at least one third integrated roofing accessory on a third roof; wherein the first software, the second software and the third software are configured to cause, when executed, the at least one first integrated roofing accessory, the at least one second integrated roofing accessory and third the plurality of integrated roofing accessories to form an electromagnetic communication network using the electromagnetic communication signals; and wherein at least one of the first software, the second software, and the third software are further configured to cause, when executed, the electromagnetic communication network to communicate with at least one computing device.

In some aspects, the techniques described herein relate to a method, further including integrating at least one of the at least one first integrated roofing accessory, the at least one second integrated roofing accessory, or the at least one third integrated roofing accessory into at least one modified photovoltaic module.

In some aspects, the techniques described herein relate to a method, wherein the electromagnetic communication protocol includes at least one of: a fifth-generation cellular (5G) protocol, a fourth-generation cellular (4G) protocol, a third-generation cellular (3G) protocol, a WiFi protocol, a Bluetooth protocol, a Zigbee protocol, or a Z-Wave protocol.

In some aspects, the techniques described herein relate to a method, wherein at least one of the at least one first transceiver, the at least one second transceiver, or the at least one third transceiver includes software-defined radio module.

In some aspects, the techniques described herein relate to a method, wherein the software-defined radio module includes a virtual firewall.

In some aspects, the techniques described herein relate to a method, wherein the electromagnetic communication network is defined according to an Open Methods Interconnection (OSI) model.

In some aspects, the techniques described herein relate to a method, wherein the at least one first integrated roofing accessory further includes: a compartment, holding: i) the at least one first transceiver, ii) the at least one first dielectric antenna, and iii) the at least one first edge computing device; wherein a portion of the compartment includes a roofing material; and a frame connected to the compartment and to the first roof.

In some aspects, the techniques described herein relate to a method, wherein the compartment extends vertically above the first roof In some aspects, the techniques described herein relate to a method, further including installing the frame into a ridge vent of the first roof.

In some aspects, the techniques described herein relate to a method, wherein the at least one first integrated roofing accessory further includes: a shingle, holding: i) the at least one first transceiver, ii) the at least one first dielectric antenna, and iii) the at least one first edge computing device.

In some aspects, the techniques described herein relate to a method including: controlling, by at least one first processor of at least one edge computing device of at least one first integrated roofing accessory, at least one first transceiver to produce electromagnetic communication signals using at least one electromagnetic communication protocol; wherein the at least one first integrated roofing accessory is installed on a first roof; controlling, the at least one first transceiver, at least one first dielectric antenna to emit the electromagnetic communication signals according to the at least one electromagnetic communication protocol; controlling, by at least one second processor of at least one edge computing device of at least one second integrated roofing accessory, at least one second transceiver to produce the electromagnetic communication signals using the at least one electromagnetic communication protocol; wherein the at least one second integrated roofing accessory is installed on a second roof; controlling, the at least one second transceiver, at least one second dielectric antenna to emit the electromagnetic communication signals according to the at least one electromagnetic communication protocol; controlling, by at least one third processor of at least one edge computing device of at least one third integrated roofing accessory, at least one third transceiver to produce the electromagnetic communication signals using the at least one electromagnetic communication protocol; wherein the at least one third integrated roofing accessory is installed on a third roof; controlling, the at least one third transceiver, at least one third dielectric antenna to emit the electromagnetic communication signals according to the at least one electromagnetic communication protocol; producing, by the at least one first processor, the at least one second processor and the at least one third processor, an electromagnetic communication network using the electromagnetic communication signals; and causing the network to communicate, by the at least one first processor, the at least one second processor and the at least one third processor, with at least one computing device.

In some aspects, the techniques described herein relate to a method, wherein the electromagnetic communication protocol includes at least one of: a fifth-generation cellular (5G) protocol, a fourth-generation cellular (4G) protocol, a third-generation cellular (3G) protocol, a WiFi protocol, a Bluetooth protocol, a Zigbee protocol, or a Z-Wave protocol.

BRIEF DESCRIPTION OF THE DRAWINGS

At least one embodiment of the disclosure is herein described, by way of example only, with reference to the accompanying drawings. With specific reference now to the drawings in detail, the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
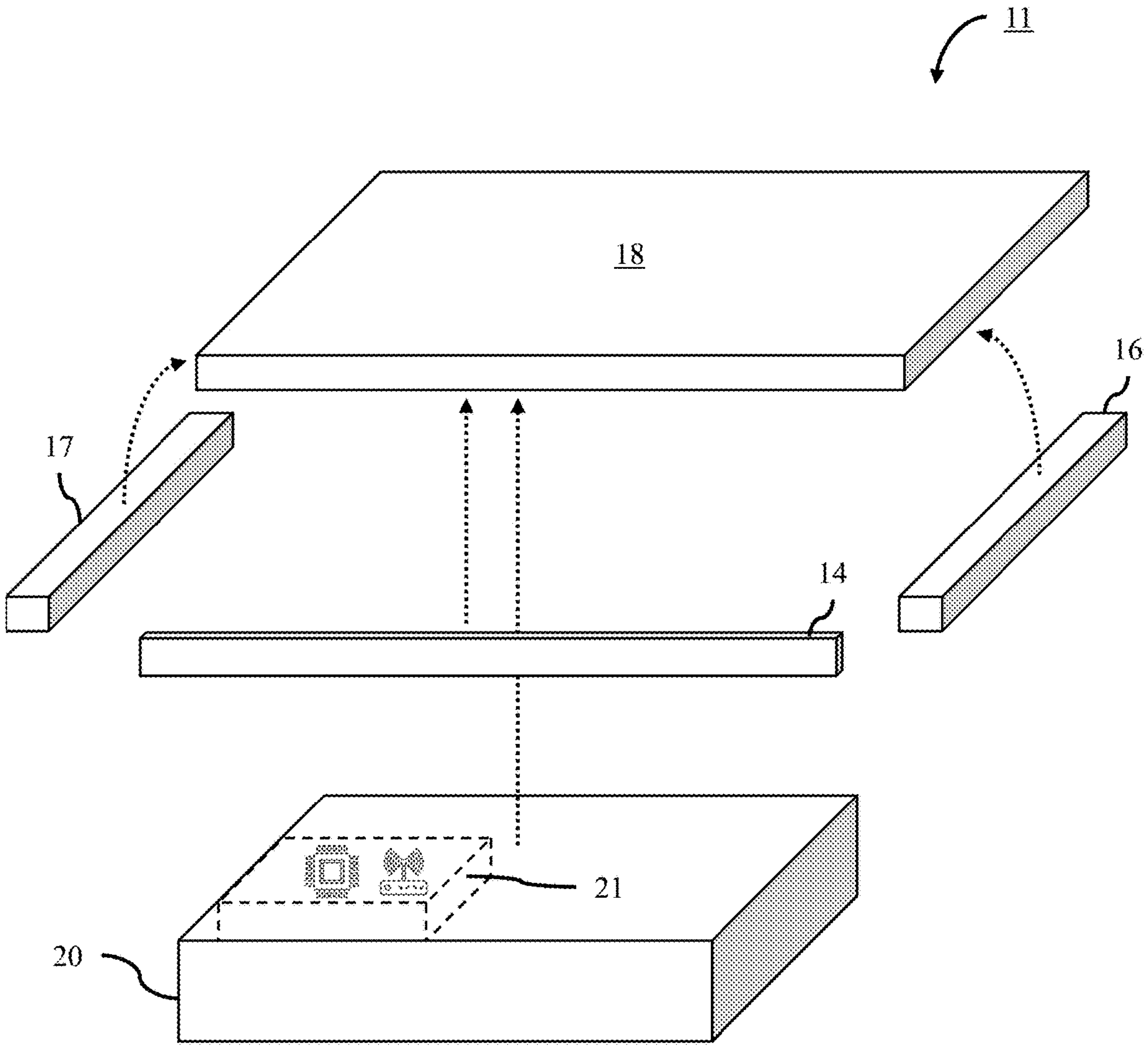
FIG. 1 depicts a non-limiting embodiment of an integrated roofing accessory according to the present disclosure.

Among those benefits and improvements that have been disclosed, other objects and advantages of this disclosure will become apparent from the following description taken in conjunction with the accompanying figures. Detailed embodiments of the present disclosure are disclosed herein; however, the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references.

All prior patents, publications, and test methods referenced herein are incorporated by reference in their entireties.

Some embodiments of the present disclosure relate to methods and systems that include the least one integrated roofing accessory. As defined herein an "integrated roofing accessory" is a roofing accessory with at least one 5G-infrastructure-supporting ("5G-enabled") electronic component. In some embodiments, the at least one 5G-infrastructure-supporting electronic component is embedded within at least one roofing accessory component. In another embodiments, the at least one 5G-infrastructure-supporting electronic component is directly or indirectly attached to at least one roofing accessory component.

Some embodiments of the present disclosure relate to at least one integrated roofing accessory. Some embodiments of the present disclosure include a plurality of integrated roofing accessories. Some embodiments of the present disclosure include at least three integrated roofing accessories. Some embodiments of the present disclosure include at least five integrated roofing accessories. Some embodiments of the present disclosure include at least ten integrated roofing accessories. Some embodiments of the present disclosure include at least fifty integrated roofing accessories. Some embodiments of the present disclosure include at least one hundred integrated roofing accessories. Some embodiments of the present disclosure include at least one-thousand integrated roofing accessories.

In some embodiments, there are 1 to 10,000 integrated roofing accessories. In some embodiments there are 1 to 5000 integrated roofing accessories. In some embodiments, there are 1 to 1000 integrated roofing accessories. In some embodiments, there are 1 to 100 integrated roofing accessories. In some embodiments, there are 1 to 50 integrated roofing accessories. In some embodiments, there are 1 to 25 integrated roofing accessories. In some embodiments, there are 1 to 10 integrated roofing accessories. In some embodiments, there are 1 to 5 integrated roofing accessories. In some embodiments, there are 1 to 2 integrated roofing accessories.

In some embodiments, there are 2 to 10,000 integrated roofing accessories. In some embodiments, there are 5 to 10,000 integrated roofing accessories. In some embodiments, there are 10 to 10,000 integrated roofing accessories. In some embodiments, there are 50 to 10,000 integrated roofing accessories. In some embodiments, there are 100 to 10,000 integrated roofing accessories. In some embodiments, there are 500 to 10,000 integrated roofing accessories. In some embodiments, there are 1000 to 10,000 integrated roofing accessories. In some embodiments, there are 5000 to 10,000 integrated roofing accessories.

In some embodiments, there are 2 to 5000 integrated roofing accessories. In some embodiments, there are 5 to 1000 integrated roofing accessories. In some embodiments, there are 10 to 5000 integrated roofing accessories. In some embodiments, there are 50 to 100 integrated roofing accessories. In some embodiments, there are 60 to 90 integrated roofing accessories. In some embodiments, there are 70 to 80 integrated roofing accessories.

Non-limiting examples of the at least one roofing accessory component of the at least one integrated roofing accessory include: roofing caps, laminate roofing accessories, roofing sheets, ridge caps, ridge vents, roofing frames, roofing shingles and the like, or any combination thereof. Additional non-limiting examples of the at least one portion of the roofing accessory are found in U.S. Pat. Nos. 7,165,363 and 10,180,001, both of which are incorporated by reference in their respective entireties.

Non-limiting examples of the at least one electronic component of the at least one integrated roofing accessory include: at least one antenna, at least one solar array, at least one battery, at least one computing device, at least one controller, at least one processor, the like, or any combination thereof. The at least one electronic component may also include one or more processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth. Additional examples of suitable electronic components can be found in US Patent Application Publication No. 2019/0123679, which is incorporated by reference herein in entirety.

As used herein, the term “dynamically” means that events and/or actions can be triggered and/or occur without any human intervention. In some embodiments, events and/or actions in accordance with the present description can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term “real-time” is directed to an event/action that can occur instantaneously or almost instantaneously in time when another event/action has occurred. For example, the “real-time processing,” “real-time computation,” and “real-time execution” all pertain to the performance of a computation during the actual time that the related physical process (e.g., a user interacting with an application on a mobile device) occurs, in order that results of the computation can be used in guiding the physical process.

FIG. 1 depicts a non-limiting exemplary embodiment of a 5G cell in having an integrated roofing accessory described herein. In the non-limiting exemplary embodiment, integrated roofing accessory 11 may be in a form of frame that may include at least one cover 18, and at least one electronics compartment 20, jointly referenced herein as the frame components. In some embodiments, the frame components may also include a front edge portion 14, a right edge portion 16, a left edge portion 17 and a back-edge portion (not shown). Together, the front edge portion 14, the right edge portion 16, the left edge portion 17 or back edge portion may form a frame to carry or enclose the cover 18 and electronics compartment 20. In some embodiments, the combination of the frame, the cover 18 and the electronics compartment 20 may form an integrated roofing accessory 11 that may be installed on a roof (a single 5G cell site) as a unit with or without additional integrated roofing accessories.

In some embodiments, the front edge portion 14, the right edge portion 16, the left edge portion 17 or back edge portion may be separately attachable to each other, to the cover 18, or both. However, in some embodiments, the front edge portion 14, the right edge portion 16, the left edge portion 17 or back edge portion are all fixed to each other, such as by being integrally formed together, fastened together with a suitable fastener (e.g., bolt, screw, rivet, pin, etc.), connected via an adhesive, or by some other method. The frame of the integrated roofing accessory 11 may then carry the cover 18 and/or electronics compartment 20. In some embodiments, the frame components may be made of any material. In some embodiments, the frame components include at least one of molded or extruded plastic, aluminum, a polymer composite material, the like, or any combination thereof.

In some embodiments, each of the cover 18, electronics compartment 20 and any other frame components may be integrally formed, e.g., by, for example, without limitation, molding or cutting the electronics compartment 20 into a material, such as, e.g., roofing material (e.g., a polymer or other suitable roofing material). Thus, the electronics of the electronics compartment 20 as well as the attachment mechanisms of the front edge portion 14, the right edge portion 16, the left edge portion 17 or back edge portion may be embedded into the material.

Figure 2:
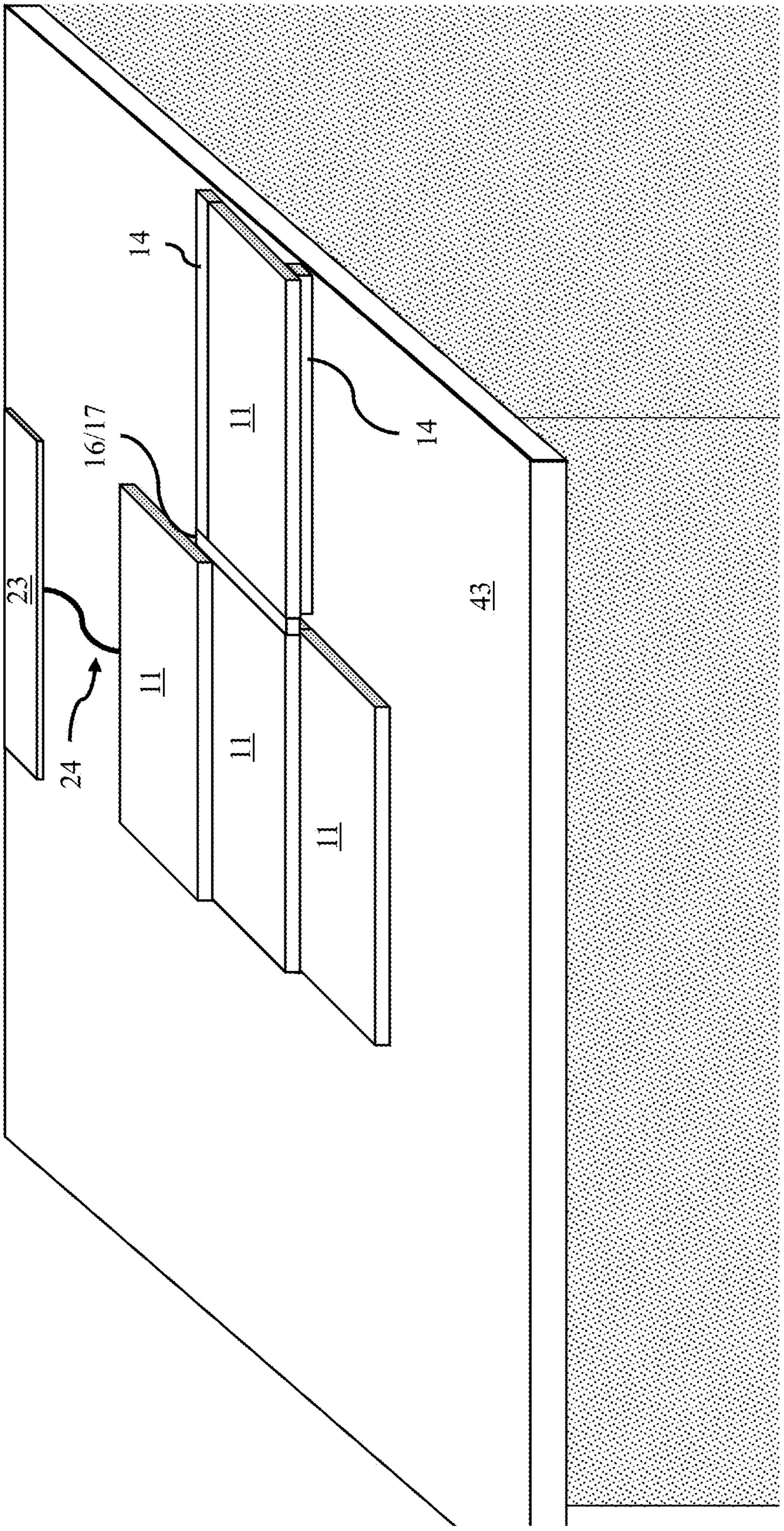
FIG. 2 depicts a non-limiting embodiment depicting the attachment of the integrated roofing accessory of FIG. 1 to a roof.

In some embodiments, the front edge portion 14, the right edge portion 16, the left edge portion 17 or back edge portion, or a combination thereof may be fixed to the cover 18 or removably attached. Moreover, as shown in FIG. 2, one or more roofing accessories 11 can be joined via one or more frame components (for example, without limitation, by one or more attachment mechanisms on the front edge portion 14, the right edge portion 16, the left edge portion 17 or back edge portion, or a combination thereof). For example, integrated roofing accessories 11 may be removable joined among themselves and/or removably joined to other roofing accessories and components, such as shingles, waterproofing membranes, underlayment, tiles, photovoltaic panels, among other suitable roofing accessories and components to cover a roof via, for example, without limitation, suitable mating mechanisms on one or more frame components (e.g., the cover 18) Various additional examples of the frame components that may be utilized to build and/or join the integrated roofing accessories 11 among themselves or to other roofing accessories, and their arrangements are disclosed in U.S. Pat. No. 9,169,646 which issued on Oct. 27, 2015; 9,273,885 which issued on Mar. 1, 2016; and 10,256,765 which issued on Apr. 9, 2019, all of which are incorporated herein by reference in their entirety for such specific purposes.

In some embodiments, at least one electronic component 21 is housed in the electronics compartment 20, which may be mounted to or recessed in the top surface of roof and mounted to or embedded into an underside of the cover 18. In some embodiments, cover 18 may be covered with a protective material chosen from at least one of, a polymer, an epoxy, the like, or combinations thereof. In some embodiments, the frame components may also include at least one additional electronics compartment (not shown), which may include at least one second electronic component and wiring to electrically connect the integrated roofing accessory 11 to additional roofing accessories and infrastructure (e.g., power source, photovoltaic panels, additional integrated roofing accessories 11, etc.). For example, one or more the frame components may be formed with a data bus or data bussed to enable electronic communication with mating busses of adjacent and/or attached additional roofing accessories. As such, electronic components 21 may interconnect with electronic components in other roofing accessories to create a system of interconnect roofing accessories.

In some embodiments, the cover 18 and electronics compartment 20 form a modified photovoltaic module of the integrated roofing accessory 11. For example, the modified photovoltaic module may have a photovoltaic panel employed as the cover 18. In some embodiments, the modified photovoltaic module includes a frame constructed from the frame components, and the electronic components 21 included within the electronics compartment 20. In some embodiments, electronics compartment 20 may be integrated into the photovoltaic panel, when such is utilized as the cover 18, or in one or more of the front edge portion 14, the right edge portion 16, the left edge portion 17 or back edge portion of the frame components. In some embodiments, the electronics compartment 21 may be an additional compartment enclosed within the integrated roofing accessory 11 (e.g., enclosed by one or more framing components (e.g., the cover 18)).

In some embodiments, the modified photovoltaic module may include a photovoltaic panel (as the cover 18), that may be modified to collocate 5G-enabled antennae with the photovoltaic panel, e.g., without limitation, by placing one or more antenna elements between photovoltaic cells of the photovoltaic panel, placing one or more antenna elements over or under photovoltaic cells of the photovoltaic panel, integrating antenna elements into the photovoltaic cells of the photovoltaic panel, or by another suitable technique. Accordingly, a 5G radio of the electronic components 21 may emit a signal via the photovoltaic panels using the collocated antennae.

In some embodiments, the integrated roofing accessory 11 may emit 5G signals using one or more antennae integrated into the cover 18. For example, a dielectric antenna may be embedded in a polymer sized to cover one or more frame components such as, without limitation, the electronics compartment 20. In some embodiments, the dielectric antenna may be a patch antenna, or other suitable antenna for embedding in the cover 18 such that the cover 18 may form an antenna module covering the electronic components 21 of the integrated roofing accessory 11. As a result, the cover 18 may serve as both a roofing accessory to weatherproof a roof of a house, as well as an antenna for a 5G network, as described below.

As shown in FIG. 2, the integrated roofing accessories 11 may be mounted onto a roof 43 using any suitable attachment mechanism such as fasteners (e.g., nails, screws, pins) and/or adhesives, or by attachment mechanisms mating to the attachment mechanisms of the frame components (left and right edge portions 16/17, front edge portion 14, and back edge portion (not shown)), such as the attachment mechanisms disclosed in U.S. Pat. Nos. 9,169,646, 9,273,885, and 10,256,765, incorporated by reference above. In some embodiments, the integrated roofing accessories 11 can be coated with asphalt before, during, or after installation. In some embodiments, the integrated roofing accessories 11 may be mounted on, under, or within one or more roofing materials. As used herein, the term "roofing material" includes, but is not limited to, shingles, waterproofing membranes, underlayment, tiles and photovoltaic panels.

In some embodiments, the integrated roofing accessories 11 on the roof 43 may electrically communicate with each other wirelessly or via a wired connection routed through the side portions 16/17 (e.g., via a bus, as described above). Accordingly, in some embodiments, one integrated roofing accessory 11 on the roof 43 can be connected to a power source, such as, e.g., via wiring 24 to a connection in a ridge vent 23 or to some other power source connection. However, in some embodiments, each roofing accessory 11 may be separately connected to the wiring 24 to the ridge vent 23.

In some embodiments, the at least one integrated roofing accessory may include electronics components 21 including a communication module that is configured to allow 5G signals to be transmitted. In some embodiments, the at least one integrated roofing accessory may include electronics components 21 including a communication module that is configured to allow 5G signals to be received. In some embodiments, the at least one integrated roofing accessory may include electronics components 21 including a communication module that is configured to allow 5G signals to be transmitted and received.

In some embodiments, the at least one integrated roofing accessory includes at least one embedded antenna. As used herein, the term "antenna" or "antennae" can refer to a device that is part of a transmitting or receiving system to transmit or receive wireless signals. In some embodiments, the at least one embedded antenna is configured to perform at least one of the following operations: receiving electromagnetic waves (e.g., 5G signals), transmitting electromagnetic waves (e.g., 5G signals), or any combination thereof.

In some embodiments, the at least one integrated roofing accessory is configured to support at least one signal propagation strategy. The at least one signal propagation strategy includes, but is not limited to, at least one of: many inputs-many outputs (MIMO), beam forming mesh, the like, or any combination thereof.

In some embodiments, the at least one embedded antenna is at least one dielectric antenna. In some embodiments, the at least one dielectric antenna takes the form of at least one dielectric antenna array. In some embodiments, the at least one dielectric antenna array includes a plurality of dielectric antennas configured to wirelessly receive a controllable beam in response to electromagnetic waves. In some embodiments, the at least one dielectric antenna array includes a plurality of dielectric antennas configured to wirelessly transmit a controllable beam in response to the electromagnetic waves. In some embodiments, the at least one dielectric antenna array includes a plurality of dielectric antennas configured to wirelessly transmit and receive a controllable beam in response to the electromagnetic waves.

In some embodiments, the dielectric antenna is embedded within the cover 18 or is covered by the cover 18 within the at least one recessed electronics compartment 19. Accordingly, the cover 18 may be constructed from a material that has a minimal effect on the 5G signals emitted by the dielectric antenna, such as a material that is transparent to mmWave signals, thus causing sufficiently low attenuation to the mmWave signals for a stable data transmission or reception. For example, the cover 18 may include a polymer, including engineered polymers, such as the D30™ Gear4™ and 5G Signal Plus material having microvoids for reducing mmWave attenuation, as disclosed by "D30 INTRODUCES 5G SIGNAL PLUS TECHNOLOGY", D30 Press Release, <https://www.d3o.com/partner-support/press-releases/d30-introduces-5g-signal-plus/> (accessed, 1 Sep. 2020), herein incorporated by reference in its entirety. In some embodiments, the dielectric antenna is mounted on an exterior surface of the at least one frame 12, e.g., on an exterior of the cover 18 relative to the at least one recessed electronics compartment 19.

In some embodiments, the at least one integrated roofing accessory may include at least one of an embedded photovoltaic array (e.g., an array of photovoltaic panels), an embedded battery, or any combination thereof. In some embodiments, at least one of the embedded photovoltaic array, the embedded battery, or any combination thereof can dynamically supply power to roofing accessories and solutions.

In some embodiments, the embedded battery is configured to be charged by either the embedded photovoltaic array or an external power source. In some embodiments, the embedded battery is configured to deliver direct current (DC) power to devices or systems on or around a roof. In some embodiments, the embedded battery is configured to deliver alternating current (AC) power to devices or systems on or around a roof.

In some embodiments, the at least one integrated roofing accessory includes at least one of: at least one computing device, at least one storage component, or at least one memory component. In some embodiments, the at least one integrated roofing accessory is configured to dynamically carry out prescribed functions. In some embodiments, the at least one integrated roofing accessory is configured to be controlled remotely by a network operator or administrator (e.g., a 5G network), such as in a software defined network 30 as described below with reference to FIG. 3A. In some embodiments, the at least one integrated roofing accessory is configured to be controlled remotely by a wired connection. In some embodiments, the at least one integrated roofing accessory includes a base configuration. In some embodiments, the at least one integrated roofing accessory can be expanded from the base configuration.

Non-limiting examples of the at least one computing device include at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like. Additional non-limiting examples of the at least one computing device include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Non-limiting examples of the at least one storage component or the least one memory component include: read only memory (ROM); random access memory (RAM); magnetic disk storage media; optical storage media; flash memory devices; electrical, optical, acoustical or other forms of propagated signals (e.g., carrier waves, infrared signals, digital signals, etc.), or any combination thereof.

In some embodiments, a plurality of integrated roofing accessories described herein can be installed on a plurality of roofs, so as to create an integrated roofing accessory network (5G network). In some embodiments, a plurality of integrated roofing accessories described herein can be installed on a single roof so as to create the integrated roofing accessory network.

In some embodiments, a method of using an integrated roofing accessory network described herein includes: providing a plurality of integrated roofing accessories as described herein; transmitting at least one electromagnetic signal (e.g., a 5G signal) from a first integrated roofing accessory; and receiving the at least one electromagnetic signal by a second integrated roofing accessory. In some embodiments, the second integrated roofing accessory further transmits the at least one electromagnetic signal to a third integrated roofing accessory, and so on. In some embodiments, the first integrated roofing accessory is located on a first building, the second integrated roofing accessory is located on a second building, the third integrated roofing accessory is located on a third building, and so on.

Figure 3A:
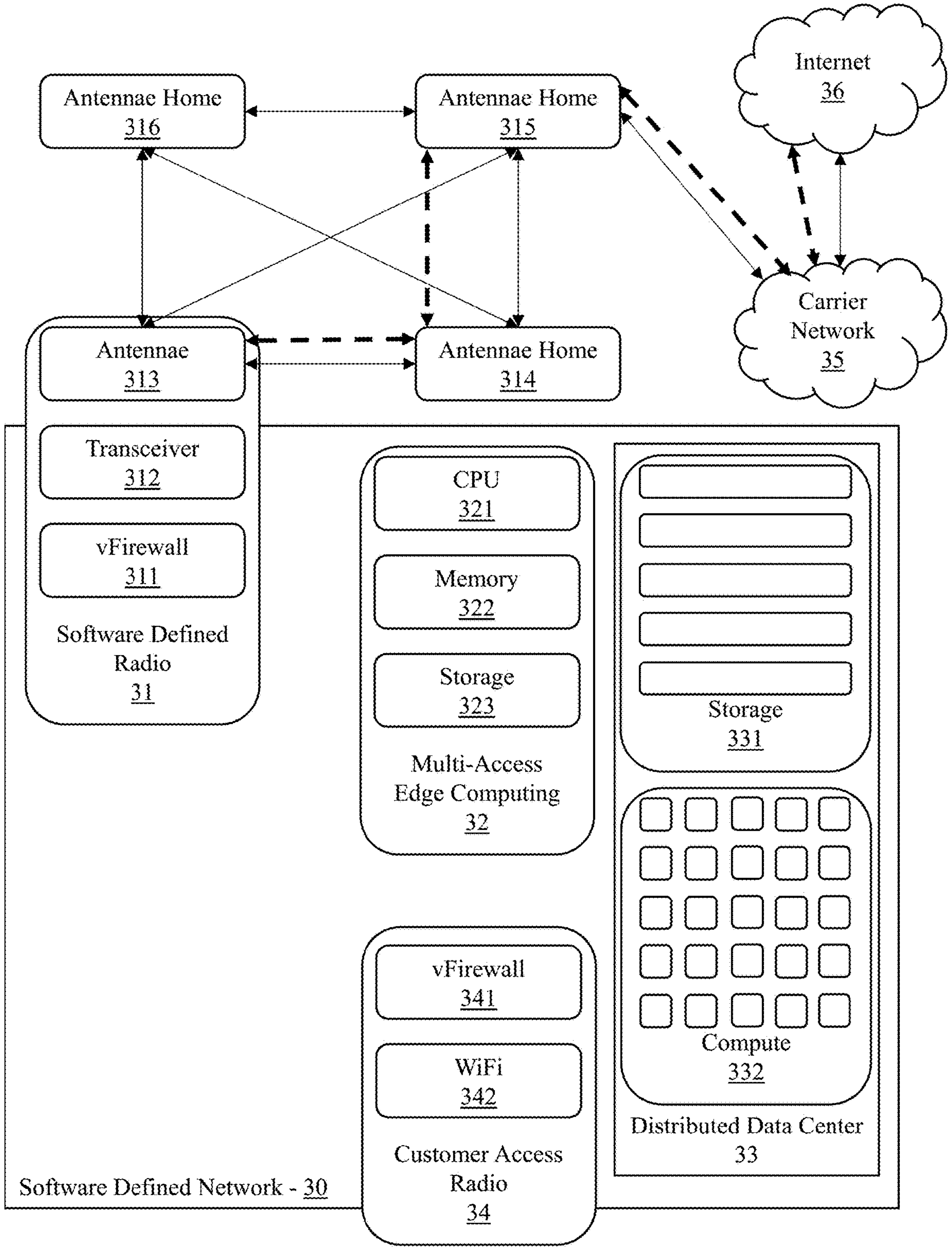
FIGS. 3A and 3B depict non-limiting embodiments depicting schematics of a 5G network employing antennae integrated into the integrated roofing accessory of FIG. 1.

FIG. 3A depicts a networking model incorporating a 5G-enabled integrated roofing accessory 11 according to aspects of embodiments of the present description.

In some embodiments, the integrated roofing accessory network may be configured to utilize Open Systems Interconnection (OSI) model, utilizing a flamework of standards for communication between different systems manufactured by different vendors, to communicate between integrating roofing accessories and other devices and/or systems (e.g., wireless carrier network, home network, etc.). The OSI model creates an open systems networking environment where any vendor's computer system, connected to any network, freely shares data with any other computer system on that network, or on a linked network.

Typically, the OSI model organizes the communication process into seven different layers of interrelated protocols in a layered sequence. Layers 1 through 3 define network access protocols and layers 4 through 7 deal with end-to-end communication protocols between a message source and a message destination. Each layer includes at least one function that is within an upper and a lower logical boundary. The services of each layer are combined with the services of lower layers to create new services that are made available to the higher layers. The layers include:

a. Layer 1 is a physical layer that responsible for the transmission and reception of unstructured raw data between a device and a physical transmission medium, including converting the digital bits into electrical, radio, or optical signals, with layer specifications defining characteristics such as voltage levels, the timing of voltage changes, physical data rates, maximum transmission distances, modulation scheme, channel access method and physical connectors;

b. Layer 2 is a data link layer that provides node-to-node data transfer via a link between two directly connected nodes, including detecting detects, and possibly correcting, errors that may occur in the physical layer, with definitions of the protocol to establish and terminate a connection between two physically connected devices, and the protocol for flow control between them;

c. Layer 3 is a network layer that provides the functional and procedural means of transferring variable length data sequences (called packets) from one node to another connected in "different networks" for routing and switching functions;

d. Layer 4 is a transport layer utilizing layers 1 to 3 to provide an end-to-end service having required characteristics for the higher layer functions, including the functional and procedural means of transferring variable-length data sequences from a source to a destination host, while maintaining the quality of service functions;

e. Layer 5 is a session layer that controls the dialogues (connections) between computers to provide the means to establish a session connection and to support an orderly exchange of data and related control functions for a particular communication service;

f. Layer 6 is a presentation layer that provides means for data formatting and code conversion to map the syntax and semantics to communication between application layer entities; and g. Layer 7 is an application layer that interacts with software applications that implement a communicating component, the protocols of which provide the actual service sought by an end user.

In some embodiments, the set-up of the exemplary integrated roofing accessory network in accordance with present disclosure may include software modules or combination software and hardware modules forming software-defined radio (SDR) 31 that include software that executes and assembles OSI layers 3-7 and transmission hardware (e.g., antennae 313 and transceivers 312) that execute OSI layers 1-2, or combinations of software and hardware.

In some embodiments, the integrated roofing accessories 11 may include hardware-based radio modules for interfacing with a 5G network. The radio modules may include circuitry for each of, e.g., amplifying, filtering, mixing, attenuating, etc., However, in some embodiments, the integrated roofing accessories employ SDR 31 modules. An SDR 31 module can be formed from hardware including a general-purpose processing device with software-based virtual signal processing components for amplifying, filtering, mixing, attenuating, etc. to produce the SDR 31 through virtual means.

In some embodiments, a basic SDR 31 module may include a processing device (e.g., central processing unit (CPU) or graphical processing unit (GPU)) equipped with an analog-to-digital converter, preceded by some form of RF front end. In some embodiments, the RF front end includes antennae 313 (e.g., one or more dielectric antennae or other suitable antenna types) and a transceiver 312. Significant amounts of signal processing are handed over to the general-purpose processor, rather than being done in special-purpose hardware (electronic circuits). Such a design produces a radio which can receive and transmit widely different radio protocols based solely on the software used.

In some embodiments, layer 1 of a software defined network 30 according to the OSI model layers can include the physical components of the integrated roofing accessories 11 and respective SDR 31 modules. In some embodiments, such physical components may include, e.g., one or more antennae 313. Each integrated roofing accessory 11 on each building may include physical antennae 314-316 to form a network of integrated roofing accessories 11 installed as roofing accessories throughout an area.

As described above, to improve signal density and signal number, as well as maximize the number of concurrent connections, the antennae 313 may include antenna elements positioned on a roof of a structure, such as house or building. In some embodiments, the antenna elements may be configured for 5G signaling. In some embodiments, the antennae 313 may include further elements for 4G signaling, or the 5G elements may be compatible with the frequencies for 4G.

In particular, in some embodiments, the integrated roofing accessories 11 may employ layer 1, or physical, components including antennae 313 to provide an uplink and downlink signal transmission method for random access, channel measurement, and terminal feedback in a cellular network using fifth generation (5G) frequency bands including unlicensed, licensed shared and extremely high frequency (EHF) bands, as well as any other 5G functionalities over 5G and mmWave frequency bands.

In some embodiments, the 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog or digital beam forming, or other signal propagation enhancements, and combinations thereof. Accordingly, the integrated roofing accessories 11 may include antennae 313 that incorporate such MIMO, FD-MIMO, array, beamforming and other technologies for improved mmWave signal propagation.

In some embodiments, such integrated roofing accessories 11 employ a physicalantennae 313 to facilitate development of advanced small cells, cloud radio access networks (RANs), ultra-dense networks, device-to-device (D2D) communication, wireless backhaul, moving network, cooperative communication, coordinated multi-points (COMP), reception-end interference cancellation and the like. In a 5G system, such as one formed by a network of the integrated roofing accessories 11 (and, optionally, additional 5G-enabled devices and systems), Orthogonal Frequency Division Multiplexing (OFDM), hybrid frequency shift keying (FSK), quadrature amplitude modulation (QAM) (FQAM) and sliding window superposition coding (SWSC) may be employed individually or in combination as advanced coding modulation (ACM). In some embodiments, filter bank multi carrier (FBMC), non-orthogonal multiple access (NOMA), and sparse code multiple access (SCMA) as an advanced access technology may be incorporated instead or in addition.

Typically, in 5G communication, use of new frequency bands may be employed to obtain wider bandwidths for data rates of at least 1 Gbps. The mmWave frequency band in particular is a candidate for wide bandwidth transmissions. The mmWave frequency band is the 30 to 300 GHz band of the electromagnetic spectrum (10 to 1 mm wavelength). Accordingly, the antennae 313 may be configured for to emit and receive signals in the mmWave frequency band. Spectrum in traditional cellular bands, below 6 GHz (e.g., "5G (lite)"), is finite. As cellular data traffic continues to grow, new frequency bands may need to be considered for use. Unlike traditional cellular bands, mmWave bands may allow large blocks of contiguous spectrum to be allocated, allowing for bandwidths on the order of GHz or more. Moreover, the mmWave frequency bands may allow multi-element antenna arrays to be used.

Accordingly, in some embodiments, the antennae 131 may include multi-element antenna arrays, which may comprise very small elements, with sizes on the scale of integrated-circuit (IC) chip elements. Use of these multi-element antenna arrays may provide large antenna gain and sufficient power output through over-the-air power combining. This combination of large bandwidths and device architectures may allow mmWave antennae 131 to provide peak rates on the order of 10 Gbps and to provide ample capacity to meet the future demands.

However, in mmWave communication, power loss is large owing to attenuation of radio waves, limiting the transmission distance. Thus, in some embodiments, beamforming may be employed to overcome the limitation of short transmission distance. With beamforming, transmission power can be concentrated in a specific direction according to the configuration of a transmitting antennae 313. When receiving, the antennae 313 may also enhance performance in a specific direction with beamforming. Beamforming (or spatial filtering) is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity In some embodiments, the antenna elements of the antennae 313 may be controllable for MIMO signaling. In radio, multiple-input and multiple-output, or MIMO, is a method for multiplying the capacity of a radio link using multiple transmission and receiving antennas to exploit multipath propagation. The MIMO is a space-time signal processing where a natural dimensional of transmitting data is complemented with a spatial dimension inherent in the use of multiple spatially distributed antennas. MIMO is able to turn multipath propagations into a benefit because signals on the transmit antennas at one end and the receiver antennas at the other end are integrated such that a quality of bit error rate (BER) or a data rate of the communication for each wireless user or a transmitting distance is improved, thereby increasing a communication network's quality of service.

A MIMO channel contains many individual radio links, hence it has Nt×Nr SISO (Single-Input Single-Output) channels (also called sub-channels), where Nt refers to a number of transmit channels, and Nr refers to a number of receive channels. For example, a 2×2 MIMO arrangement contains 4 links and hence 4 SISO channels. The SISO channels can be combined in various ways to transmit one or more data streams to the receiver. Thus, the antenna elements may be separate, individually controllable antennae 313, or sub-elements of a single antenna 313, or a combination thereof, that together may communicate data. In some embodiments, the antennae 313 may include MIMO signaling capabilities include, e.g., 2×2, 4×4, 6×6, 8×8 or more SISO channels. For example, the antennae 313 may include, e.g., phased array antennae for MIMO and microwave signal generation, including, loop and/or patch antenna elements integrated into a printed circuit board (PCB) and embedded in the integrated roofing accessory 11. For example, a wideband polarized patch antenna and in an antenna array that can cover mmWave frequency bands 5G applications may be employed, and may be single or dual-polarized. One embodiment the antenna package may a high-density interconnected (HDI) FR-4 printed circuit board (PCB) substrate, or other suitable wideband mmWave antenna array having a size to fit within the integrated roofing accessory 11 described above.

Long-Term Evolution (LTE), or 4G, is a standard developed by the 3GPP (3rd Generation Partnership Project) for wireless broadband communication for mobile devices and data terminals, based on the Global System for Mobile Communications (GSM)/Enhanced Data Rates for Global Evolution (EDGE) and Universal Mobile Telecommunications System (UMTS)/High Speed Packet Access (HSPA) technologies. It increases the capacity and speed using a different radio interface together with core network improvements over prior (3G) standards. However, Worldwide Interoperability for Microwave Access (WiMAX), Evolved HSPA (HSPA+), and LTE may be included as 4G technologies. Accordingly, the antennae 313 may additionally include GSM, EDGE, UMTS and HSPA frequencies in addition to mmWave frequencies as described above. For example, such 4G frequencies may have better range and penetration for reduced signal blockage and dissipation, thus improving long range stability. Accordingly, the 4G antenna element so the antennae 313 may be used for, e.g., backhaul communication or other long-range uses.

In some embodiments, the antennae 313 may be positioned in a location to provide the best line-of-sight to both other antennae 314 through 316 as well as 5G-enabled computing devices. Both height and orientation may play in a role in providing line-of-sight to other devices, with a high location facilitating raising the antennae 313 above potential obstructions. Accordingly, as described above, installation as a roofing accessory on residential or commercial roof may provide positioning for facilitating mesh networking with additional antennae 314 through 316 as well as 5G signaling for data transmission to and from computing devices.

Moreover, mmWave antennae 313 may require power to operate, and sometime significant amount of power. Indeed, greater power supply may improve signal propagation, or distance with which a signal may maintain throughput and stability. Installation as a roofing accessory facilitates providing roof-mounted photovoltaic panels or mains power, e.g., via a ridge vent or other similar access structure.

In some embodiments, level two components in a module of the SDR 31 and software defined network 30 can include data link components such as, e.g., a receiver, transmitter, transceiver 312 or combination thereof. In some embodiments, the transceiver 312 may be included in the electronic devices of the integrated roofing accessory 11 to control the antennae 313 for frequency control and modulation of emitted signals. Such a transceiver 312 may be selected or configured to balance complexity of signals and density or number of concurrent connections or channels with computational complexity, heat and size. In some embodiments, these factors may be balanced to achieve an optimal balance that maximizes signal complexity and number of concurrent connections while maintaining a size and heat output that is sustainable within an integrated roofing accessory 11.

Similarly, cost and circuit complexity/heat output may be balanced against power supply and amplitude of the antennae 313. As more power is supplied, the transceiver 312 may generate more heat and consume more energy, but signal propagation may be extended. Additionally, a higher quality, more sensitive and complex transceiver 312 may improve signal-to-noise ratios for better signal stability and data transmission.

In some embodiments, the transceiver 312 plays an active role in the SDR 31 by effectuating at least four sub-layers to the OSI Model layer 2, including, e.g., Service Data Adaptation Protocol (SDAP), Packet Data Convergence Protocol (PDCP), Radio Link Control, Medium Access Control, among others.

The medium access control (MAC) sublayer is the layer that controls the hardware responsible for interaction with the wired, optical or wireless transmission medium. The MAC sublayer and the logical link control (LLC) sublayer together make up the data link layer. Within the data link layer, the LLC provides flow control and multiplexing for the logical link (i.e. EtherType, 802.1Q VLAN tag etc.), while the MAC provides flow control and multiplexing for the transmission medium.

RLC is located on top of the 3GPP MAC-layer and below the PDCP-layer. The main tasks of the RLC protocol are: Transfer of upper layer Protocol Data Units (PDUs) in one of three modes: Acknowledged Mode (AM), Unacknowledged Mode (UM) and Transparent Mode (TM); Error correction through ARQ (only for AM data transfer); Concatenation, segmentation and reassembly of RLC SDUs (UM and AM); Re-segmentation of RLC data PDUs (AM); Reordering of RLC data PDUs (UM and AM); Duplicate detection (UM and AM); RLC SDU discard (UM and AM); and RLC re-establishment.

Protocol error detection and recovery Packet Data Convergence Protocol (PDCP) is specified by 3GPP in TS 25.323 for UMTS, TS 36.323 for LTE and TS 38.323 for 5G New Radio (NR). PDCP is located in the Radio Protocol Stack in the UMTS/LTE/5G Air interface on top of the RLC layer.

A SDAP sub-layer is above the PDCP sublayer in 5GNR. PDCP is the first sublayer in the 3GPP protocol stack that receives/transmits network layer traffic (TCP/IP traffic). Data Radio Bearer (DRB) is the logical connection used inside the 5G protocol stack to carry data PDUs. SDAP functionality is to map quality-of-service (QOS) flow to and from DRB at the PDCP sublayer in both downlink and uplink direction. The main services and functions of SDAP include the following: mapping between a QoS flow and a data radio bearer; marking QoS flow ID (QFI) in both DL and UL PDUs; and mapping the flow to one of the uplink DRB. Similarly, when a downlink PDU is received at the PDCP and it contains SDAP header which is removed, and the PDU is passed to upper layer.

Accordingly, in some embodiments, the transceiver 312 controls the antennae 313 for efficient transmission via, e.g., beamforming and MIMO functionality as described above. A beamforming protocol, such as that defined as part of the proposed IEEE 802.11 ad/WiGig standard, may be used to find a path between a cooperating pair of transmitter and receiver antennas. Beamforming techniques in mmWave systems are complex and require significant computing overhead to accomplish.

In some embodiments, the transceiver 312 may, therefore, include a selection from transceivers and/or modems integrated or embedded in integrated circuit or system-on-chip design. For example, a 5G modem, such as the Qualcomm Snapdragon™ X50, X52 and/or X55 modems, Analog Devices Inc. AD9375, or other suitable modem and transceiver solutions suitable to be integrated into an integrated roofing accessory 11 for a SDR 31.

In some embodiments, the antennae 313 and 312 may be packaged in, e.g., an embedded solution, such as a system-on-chip architecture, however other integrate circuit packaging methodologies may be employed to package the antennae 313 and transceiver 312 under the cover 18 in an electronics compartment 20 as the first electronic device and/or the at least one second electronic device 21. In some embodiments, the antennae 313 are separate from the transceiver 312 and in electronic communication with each via, e.g., copper wiring, or other wiring solution, or via a standardized data interface such as, e.g., PCIe, SATA, NVME, USB, ethernet, Registered Jack (e.g., RJ11), or other data communication interface, such as the wiring 22.

In some embodiments, as a separate electronic device or integrated into the system-on-chip of the transceiver 312, the SDR 31 may optionally include a virtual firewall (vFirewall) 311. In some embodiments, the vFirewall 311 may regulate data communication between the transceiver 312 and the software defined network 30 to prevent untrusted or unauthorized data, files, programs, scripts and other information from harming the software defined network 30 and software and hardware components therein.

In some embodiments, the vFirewall 311 may include a network firewall service or appliance running entirely within a virtualized environment and which provides the usual packet filtering and monitoring provided via a physical network firewall. The vFirewall 311 can be realized as a traditional software firewall on a guest virtual machine already running, a purpose-built virtual security appliance designed with virtual network security in mind, a virtual switch with additional security capabilities, or a managed kernel process running within the host hypervisor.

In some embodiments, the vFirewall 311 may operate in different modes to provide security services, depending on the point of deployment. For example, the vFirewall 311 may operate in either bridge-mode or hypervisor-mode. Both may come shrink wrapped as a virtual security appliance and may install a virtual machine for management purposes.

A virtual firewall operating in bridge-mode acts like its physical-world firewall analog; it sits in a strategic part of the network infrastructure—usually at an inter-network virtual switch or bridge—and intercepts network traffic destined for other network segments and needing to travel over the bridge. By examining the source origin, the destination, the type of packet it is and even the payload the VF can decide if the packet is to be allowed passage, dropped, rejected, or forwarded or mirrored to some other device. Initial entrants into the virtual firewall field were largely bridge-mode, and many offers retain this feature.

By contrast, a virtual firewall operating in hypervisor-mode is not actually part of the virtual network at all, and as such has no physical-world device analog. A hypervisor-mode virtual firewall resides in the virtual machine monitor or hypervisor where it is well positioned to capture VM activity including packet injections. The entire monitored VM and all its virtual hardware, software, services, memory and storage can be examined, as can changes in these. Further, since a hypervisor-based virtual firewall is not part of the network proper and is not a virtual machine its functionality cannot be monitored in turn or altered by users and software limited to running under a VM or having access only to the virtualized network.

In some embodiments, because the vFirewall 311 is positioned in the SDR 31 at the intersection between the software defined network 30 and other antennae 314 through 316 of a 5G mesh network, the vFirewall 311 may be configured to operate in bridge mode.

In some embodiments, as a SDR 31, the transceiver 312 and vFirewall 311 may be implemented as software components within a general-purpose processing device, such as, e.g., a central processing unit (CPU) (e.g., an x86, x64, ARM, RISC-V, PowerPC, MIPS, SPARC, or other complex instruction set computer (CISC) or reduced instruction set computer (RISC) processors), graphical processing unit (GPU), neural processing unit (NPU), field programmable gate array (FPGA), microprocessor, or other processing device or combinations thereof. In some embodiments, different functions of the transceiver 312 and vFirewall 311 may be configured to be implemented with separate processing components of processor package including multiple processing devices, processing or compute cores, or combinations thereof. For example, the processor package may include, e.g., one or more CPU cores, one or more GPU cores, one or more NPU cores, a digital-to-analog (DAC) converter, an analog-to-digital converter (ADC), a 5G model including radio-frequency receiver, transmitter and/or transceiver, cache, on chip storage, random access memory (RAM), as well as data interfaces to interface with one or more additional processor devices, components or packages as well as to interface with the antennae 313 via the transceiver 312.

In some embodiments, the processing components of the SDR 31 may additionally be configured to integrate the SDR 31 into one or more networks, including the software defined network 30 and a 5G mesh network incorporating additional antennae 314 through 316 from additional integrated roofing accessories 11 and additional 5G-enabled computing devices, as well as any other suitable network. Accordingly, the SDR 31 may cooperate with, e.g., the software defined network 30 to implement networking and communication protocol layers of the OSI Model. For example, such layers may include layer 3 for networking, layer 4 for transport and layer 5 for session control and configuration. Such layers facilitated the SDR 31 to communicate with other antennae 314 through 316 even where the other antennae 314 through 316 are manufactured and programmed by different entities or using different software and firmware.

In some embodiments, the software defined network 30 implements layers 3 through 5 to establish a platform or standard network to integrate the SDR 31 into compute and communication resources. In some embodiments, the software defined network 30 implements the layers 3 through 5 to operate as a control layer for all communication between sub-systems or electronics modules of the software defined network 30 (including, e.g., the SDR 31 module), multi-access edge computing 32, distributed data components 33, consumer access radio 34 (e.g., WiFi, Bluetooth, Zigbee, Z-Wave, 4G/LTE, 5G (lite), 3G, etc.), among other sub-systems and electronics modules of the integrated roofing accessory 11 and devices in communication therewith.

In some embodiments, the software defined network 30 may integrate the sub-systems and electronics modules into a single system by defining the data traffic within the software defined network 30, e.g., using software-defined common resource management (SD-CRM). The SD-CRM can be used for networking functions and application/service functions. Thus, the SD-CRM can manage transport functions for layers zero through four as well as application functions for layers four and higher. The SD-CRM can provide a platform for network services, network control of service instantiation and management, as well as a programmable environment for resource and traffic management. The SD-CRM also can provide a consolidated network management interface to permit the combination of real time data from the service and network elements with real-time or near real-time control of the forwarding plane. Thus, embodiments of the concepts and technologies described herein can enable near real-time configuration and real-time flow setup, programmability through service and network script-like logic, extensibility for competitive differentiation, standard interfaces, and multi-vendor support, among other features. Interactions between these layers can be based upon policies to determine optimum configuration and rapid adaptation of the network to changing state and changing customer requirements for example, spikes in traffic, network outages (e.g., due to snow storms, blackouts, natural disasters, or the like), adding new services (e.g., VoIP/web RTC, authentication, etc.), maintenance, combinations thereof, or the like.

Accordingly, in some embodiments, the SD-CRM may define what communication will run over each SDR 31 module on the software defined network 30 (e.g., the SDR 31, the customer access radio 34, among others). In some embodiments, the software defined network 30 may extend to additional integrated roofing accessories 11 to incorporate the SDRs therein into a common software defined network 30. As a result, the SD-CRM may control traffic between the various SDRs 31 of the various integrated roofing accessories 11 to form a distributed computing environment for control of multiple SDR 31 modules to cooperate within a cohesive 5G network. Thus, multiple integrated roofing accessories 11 may be combined to create a larger antenna structure, facilitating modular functionality. In some embodiments, once a 5G network is created, the SD-CRM defines the traffic that traverses it.

Figure 3B:
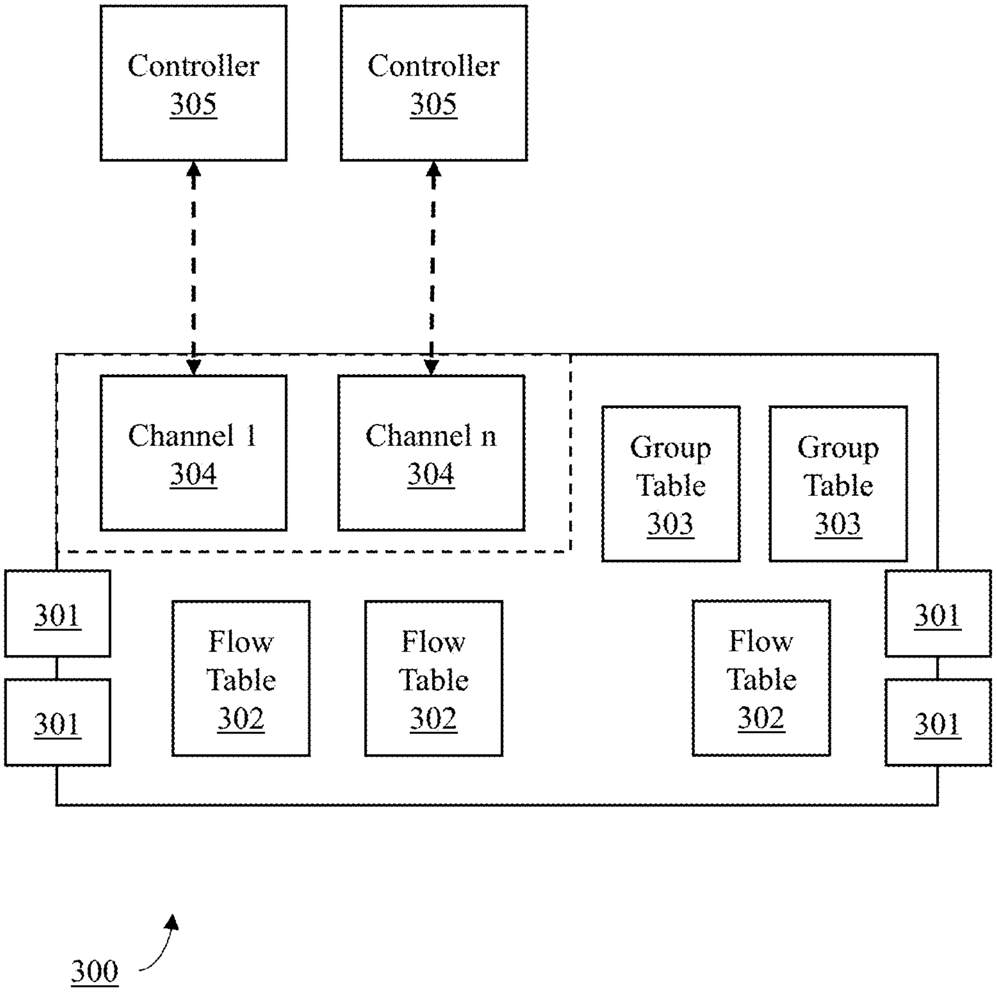

In some embodiments, the SD-CRM of the software defined network 30 may be implemented with, e.g., a network switch 300 as shown in FIG. 3B. In some embodiments, the network switch 300 may be configured to manage a software defined network 30 according to a network protocol, such as, e.g., the OpenFlow protocol, Accordingly, the network switch 300 may be a software defined (e.g., logical) switch protocol defined by one or more controllers 305. In some embodiments, however, the switch 300 may be a hardware switch or embodied in a specialized hardware device, such as, e.g., a single or multiport Ethernet switch (e.g., a Zodiac FX™ or other similar Ethernet switch), or other network switch device or devices.

In some embodiments, the network switch 300 may include one or more flow tables 302 and group tables 303, which perform packet lookups and forwarding, and one or more channels 304 to the external controller or controllers 305. The switch 300 communicates with the controllers 305 and the controllers 305 manage the switch 300 via the switch protocol by, e.g., adding, updating and deleting flow entries in flow tables 302.

In some embodiments, the switch 300 includes multiple flow tables 303. Thus, upon receiving packets of network traffic via one or more of the ports 301, the packets are compared in to entries in each flow table 302 starting with the first flow table and may continue to additional flow tables of the pipeline. The packet may first start in a table 0 and check those entries based on priority. Highest priority will match first (e.g. 200, then 100, then 1). If the flow needs to continue to another table, the packet may be advanced to the table specified in the instructions until a match is found, and the corresponding instructions are executed.

In some embodiments, the ports 301 may include physical and/or logical ports. Examples of hardware ports may include, e.g., ethernet interfaces, while logical ports may include, e.g., LGs, tunnels, loopbacks and other logical interfaces.

Referring again to FIG. 3A, the software defined network 30 may include the incorporation of data storage and compute resources. For example, a multi-access edge computing (MEC) 32 system may be employed in each integrated roofing accessory 11 or in communication with each integrated roofing accessory 11 as part of the software defined network 30. In some embodiments, the MEC 32 may include a CPU 321, a memory 322, a non-transitory storage device 323 among other processing devices and components (e.g., GPUs, NPUs, codecs, DAC, ADC, etc.). In some embodiments, the MEC 32 is integrated onto the same board or PCB as the SDR 31 module such that, e.g., compute, memory and/or storage resources are shared. However, in some embodiments, the MEC 32 may be a separate set of processing resources relative to the SDR 31 module.

In some embodiments, the MEC 32 may control the software defined network 30, including, e.g., implementing layers 3 through 5, and/or layers 6 and 7 for data presentation and application functionality, respectively. For example, the MEC 32 may provide a user application functionality to administer network protocols, security policies, flow tables, group tables, among other software administration functionalities pertaining to the implementation of layers 1 through 5 described above. Accordingly, the MEC 32 is effectively the control module for the software defined network 30 implemented by one or more integrated roofing accessories 11 with user definable policies via, e.g., suitable user interfaces. Such user interfaces may provide the user with administrative functionality to control the software defined network 30 and components therein, as well as to collect and locally store data and service metrics relative to the operation of the components and the software defined network 30. Thus, the MEC 32 may include a suitable processing package including the CPU 321, memory 322 and non-transitory storage device 323 for generating and providing to a user the user interface in a network management console. Such processing package may include, e.g., PCB mounted CPU 321, memory 322 and non-transitory storage device 323 and/or a system-on-chip, and/or other suitable processing package. For example, the MEC 32 may include, e.g., a Raspberry Pi, Arduino, Nvidia TX2, or other configurable processing package.

In some embodiments, multiple integrated roofing accessories 11 with respective antennae 313 through 316 may be networked together using 5G signals to create a broader software defined network 30. Such a broader network may be leveraged to implement a distributed datacenter 33 across the integrated roofing accessories 11 on the network. Accordingly, the software defined network 30 may be configured to share storage 331 and compute 332 resources for distributed processing and storage of user data, e.g., received via the customer access radio 34 and shared across integrated roofing accessories 11 via antennae 313 through 316. Such a distributed datacenter 33 may be employed for, e.g., cloud storage, media and data streaming, content distribution (e.g., as a content distribution network (CDN)), among other distributed applications.

In some embodiments, a user may interface directly with the software defined network 30 via a 5G connection using a 5G-enabled computing device, or via the customer access radio 34 via a customer access radio enabled device. In some embodiments, the customer access radio 34 includes, e.g., a WiFi radio 342. The customer access radio enabled device may include any computing device having hardware and/or software for communicating with the WiFi radio 342. Accordingly, the integrated roofing accessory 11 using the software defined network 30 may include both 5G connectivity as well as WiFi connectivity or other customer access wireless protocol connectivity, for example, for in-home WiFi using the same integrated roofing accessory 11 that provides 5G carrier or internet-service-provider (ISP) connectivity. In some embodiments, similar to the SDR 31, the customer access radio 34 may include a vFirewall 342 to enhanced security of the software defined network 30.

In some embodiments, the storage 331 may be implemented with suitable storage components such as, e.g., a series for solid state drives (SSD) or M.2 storage drives. M.2 drives are a newer, smaller, and faster variant of an SSD. The storage 331 subsystem may be configured in a Redundant Array of Independent Drives (RAID) variant (5 or 10) or as a Hadoop Distributed Files System (HDFS). Either system provides a level of data security and fault tolerance. HDFS has an advantage with error checking and the ability to assign multiple namenodes. Namenodes are simply indexes to where the data resides. Data Nodes can be configured to store multiple copies of the data across several drives. Namenodes manage data on the data nodes by sector-more granular and removes the need to remove an entire drive from the system like a RAID array. Depending on the RAID level it allows for one or two drive failures and still have the system function normally. However, an additional drive failure would cause catastrophic data loss. So, to prevent data loss, drives will need to be continually replaced.

In comparison, HDFS allows for sector level management per drive. Using HDFS, multiple drives failures does not cause catastrophic failure/data loss. HDFS storage management concern may be on the overall capacity of the system and namenode versus physical drive failure. Therefore, an HDFS managed storage solution may reduce the time and effort required to support an integrated roofing accessory 11 platform.

In some embodiments, complimentary to datacenter 33 storage 331 is compute 332. Compute 332 allows applications and services to be written and operate within a distributed space. Like a typical datacenter or cloud infrastructure, compute 332 may enable services to be deployed across a distributed network. Unlike primary cloud networks, the distributed datacenter 33 of the integrated roofing accessories 11 may not have defined services or applications. Rather, the distributed datacenter 33 may employ compute 332 to have a hypervisor-like service to manage and deploy infrastructure for the user. In some embodiments, each integrated roofing accessory 11 may be a network of dense single board computers (SBC) with multiple cores or embedded servers. Advantageously, such compute 332 solutions may be resilient to extreme environmental conditions, such as, e.g., high temperatures, low temperatures, moisture and humidity, vibrations, shock, among other environmental conditions. An example of a possible SBC or embedded server may include, e.g., a Grizzly VL-ESU-5070, or other suitable device.

In some embodiments, to support data science workloads, pipelines and models Graphical Processing Units (GPU) may be deployed within the integrated roofing accessory 11 in the software defined network 30 in much the same manner as the CPU. An example SBC that supports high density GPU may include, e.g., Nvidia Jetson Nano or other suitable device.

In some embodiments, the software defined network 30 within and across integrated roofing accessories 11 may be included with a power source. In some embodiments, low-power devices may be employed, such as, e.g., systems-on-chip similar to those used in smartphones and other mobile devices. Accordingly, power may be provided via, e.g., on-board batteries, photovoltaic panel mounted to the same roof as the integrated roofing accessory 11 or as a cover 18 on the integrated roofing accessory 11. However, in some embodiments, to achieve greater range and stability of the 5G signal, high power components for a more powerful SDR 31 may be employed. Accordingly, in some embodiments, the integrated roofing accessories 11 may be connected directly to mains power via, e.g., an AC to DC (AC/DC) converter, or to a larger scale solar array installed on the roof or nearby, or both.

In some embodiments, various components and devices, including 5G-enabled computing devices and 5G-enabled integrated roofing accessories 11 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile device, messaging device, data communication device, and so forth.

As used herein, the term "mobile device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

In some embodiments, the processing device may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processing device may include data-processing capacity provided by the microprocessor. In some embodiments, the microprocessor may include memory, processing, interface resources, controllers, and counters. In some embodiments, the microprocessor may also include one or more programs stored in memory.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35).NET Framework; (36) Silverlight; (37) Open Web Platform; (38) Oracle Database; (39) Qt; (40) SAP NetWeaver; (41) Smartface; (42) Vexi; and/or (43) Windows Runtime.

In some embodiments, devices and components of the integrated roofing accessories 11 of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, various devices and components of the integrated roofing accessories 11, such as the MEC 32, may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

Figure 4A:
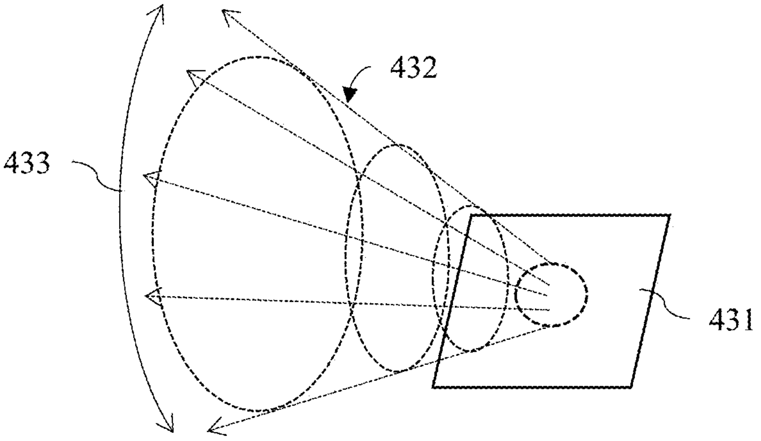
FIGS. 4A and 4B depict non-limiting embodiments depicting arrangements of integrated roofing accessories of FIG. 1 on residential roofs.

FIG. 4A depicts an example 5G transmission signal emitted from an antenna 431 of an integrated roofing accessory 11 in accordance with aspects of embodiments of the present description.

In some embodiments, 5G antennae may be directional in nature, as described above, due to factors such as beamforming and antenna shape. Accordingly, an antenna 431 may emit a signal 432 in a conical "field-of-view" (FOV) within which the angular beam steering range 433 over which the antenna 431 can direct a beamformed signal 432. The signal 432 is formed as a beam and may be emitted in any direction within the limits of the FOV of the antenna. In some embodiments, the antenna 431 may have an FOV defined by the beam steering range 433, such as, e.g., within an angle of incidence within about 45 degrees, 60 degrees, 70 degrees, or 80 degrees of a normal incidence relative to a surface of the antenna 431, or other angle of incidence. Thus, the beam steering range 433 may cover angles of incidence across about, e.g., 90, 120, 140, 160 or other suitable range of angles of incidence of beamformed 5G signals emitted from the antenna 431.

Figure 4B:
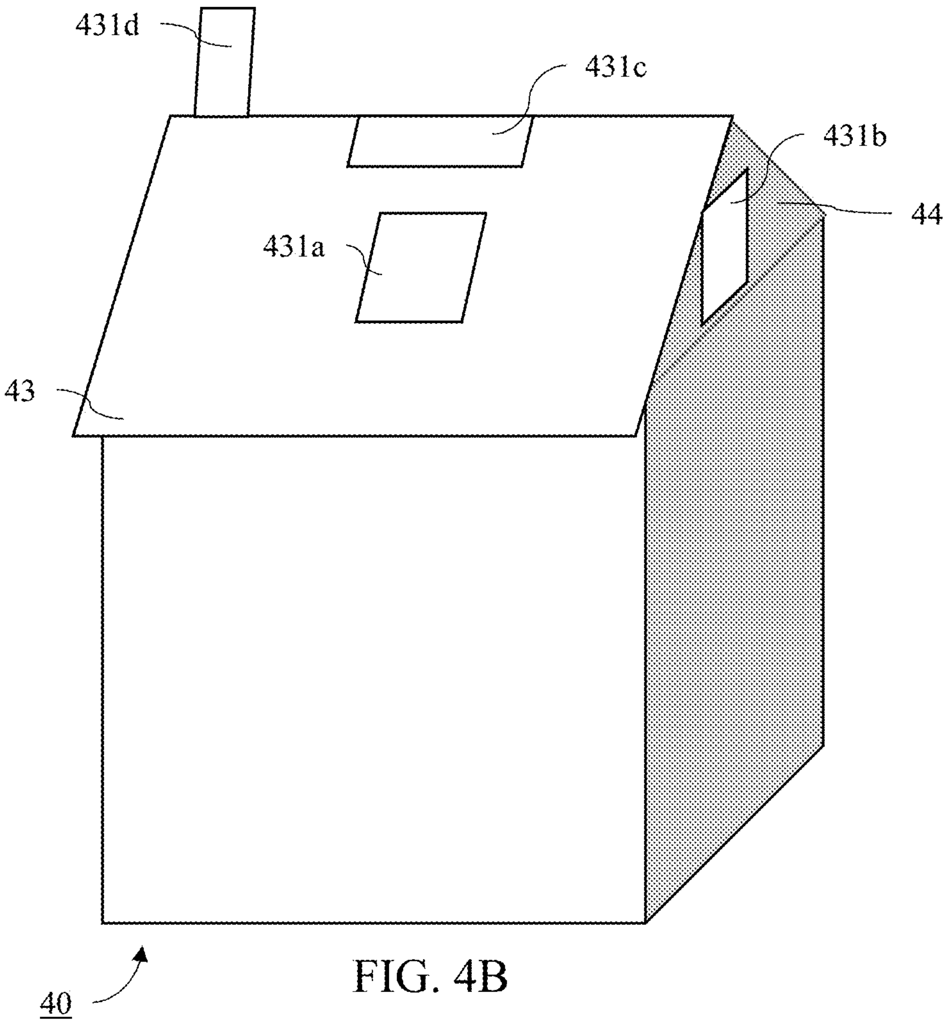

FIG. 4B depicts various integrated roofing accessory antenna placements relative to a roof of a structure in accordance with aspects of embodiments of the present description.

As described above, effectiveness of signal coverage in a physical area is affected by the orientation and position of 5G antennae due to the directional nature imposed by beamforming 5G signals. Accordingly, integrated roofing accessories 11 and associated antennae may be installed on a roof 43 as a roofing accessory in one or more of various positions and orientations to best suit the environment.

In some embodiments, an integrated roofing accessory 11 may include a coplanar integrated roofing accessory 431*a*. The coplanar integrated roofing accessory 431*a* is a roofing accessory shaped package that is installed alongside traditional roofing accessories or roofing material on the roof 43 of the structure 40. For example, the coplanar integrated roofing accessory 431*a* may have a shape matching the shingles of a residential home, thus forming a shingle for the roof, or integrated shingle. Thus, a top surface of the coplanar integrated roofing accessory 431*a* may be coplanar with the surrounding roofing material.

In some embodiments, the coplanar integrated roofing accessory 431*a* may have a thickness greater than the surrounding roofing material. In such a case, the coplanar integrated roofing accessory 431*a* may be inserted into a recess within the roof 43 such that a top surface of the coplanar integrated roofing accessory 431*a* is at a height above a top surface of the roof 43 that is coplanar with a top surface of the surrounding roofing material. However, in some embodiments, the coplanar integrated roofing accessory 431*a* may be installed on the top surface of the roof 43 such that the top surface of the coplanar integrated roofing accessory 431*a* rises to a height above the top surface of the roof 43 that is above a height of the top surface of the surrounding roofing material above the top surface of the roof 43.

In some embodiments, the coplanar integrated roofing accessory 431*a* may have the advantages of being roughly flush with the roof 43, providing a discrete device that homeowners or building owners would find less objectionable, and thus be more likely to install. However, the angle of a slope of the roof 43 direct a normal angle of incidence of an antenna of the coplanar integrated roofing accessory 431*a* upward. As a result, due to the beam steering range 433 of the coplanar integrated roofing accessory 431*a* being finite, the portion of the beam steering range 433 that can project a beam formed signal towards a device on the ground is reduced, resulting in less area that may be covered by the coplanar integrated roofing accessory 431*a*. Indeed, where the roof is horizontal, the beam steering range 433 may not extend even towards other integrated roofing accessories because the normal incidence would be directed vertically toward the sky.

Similarly, a ridge vent integrated roofing accessory 431*c* or front or back face siding integrated roofing accessory 431*b* may be employed that can be recessed into a surface of the structure 40 or mounted on the surface of the structure 40 for low profile and discrete installation. However, similar to the coplanar integrated roofing accessory 431*a*, the directional nature of the 5G antenna results in reduced sightlines afforded by the beam steering range 433, and thus reduced coverage. The ridge vent integrated roofing accessory 431*c* may have better coverage because it may be configured to have two antenna portions, with each portion aligning with the slopes of the roof 43 on each side of the ridge, thus multiplying the beam steering range 433. However, each antenna portion nevertheless may have reduced lines of sight to the ground where 5G-enabled devices may be located, thus reducing effective coverage in the area.

In some embodiments, to mitigate the coverage loss due to the directionally mounted coplanar integrated roofing accessory 431*a*, the siding integrated roofing accessory 431*b* and the ridge vent integrated roofing accessory 431*c*, multiple roofing accessories may be used on a single roof (5G cell site). For example, the coplanar integrated roofing accessory 431*a* may be installed on each roof slope of the roof 43, and the siding integrated roofing accessory 431*b* on each side of the structure, or on each face of the structure extending between roof slopes as a portion of the siding. In some embodiments, alternatively or in addition, to one or more coplanar integrated roofing accessories 431*a*, one or more siding integrated roofing accessories 431*b*, one or more ridge vent integrated roofing accessories 431*c* may be installed in the ridge vent of the roof 43. Thus, antennae from the various roofing accessories are angled in multiple directions to provide overlapping beam steering ranges 433 for increased coverage in an area around the structure 43.

Moreover, in some embodiments, the various roofing accessories can be integrated into a mesh network or a common software defined network, such as the software defined network 30 described above. As a result, the roofing accessories can share compute and storage resources, and behave as a cohesive system.

Additionally, or alternatively, each of the coplanar integrated roofing accessories 431*a* and siding integrated roofing accessories 431*b* may be antennae only or software define radios only, such as the antennae 313 and SDR 31 described above. Each coplanar integrated roofing accessory 431*a* and siding integrated roofing accessory 431*b* may interface with a hub roofing accessory in the ridge vent to centralize compute, storage, and user access radios in the ridge vent integrated roofing accessory 431*c*. Accordingly, each integrated roofing accessory may represent a modular component of an integrated roofing accessory 11 that may be separately detached and applied to various portions of the roof 43 to optimize coverage, while a control module including the centralized resources may be located in the ridge vent near access to power and infrastructure within the structure 40.

In some embodiments, a vertical attachment integrated roofing accessory 431*d* may be employed that extends up from the roof in a vertical direction above the ground and the roof 43. In some embodiments, the vertical attachment integrated roofing accessory 431*d* may have multiple vertically oriented faces, each having a horizontal angle of normal incidence relative to an antenna. For example, the vertical attachment integrated roofing accessory 431*d* may have a box configuration with four vertical faces, each vertical face including an antenna. However, any number of faces may be used, such as, e.g., 2, 3, 4, 5, 6, 7, 8, 9, 10 or more faces. In some embodiments, the faces may be arranged radially around a center point such that the combination of faces forms a prismatic shape. In some embodiments, the vertically oriented edges of each face may abut the vertically oriented edges of each adjacent face to form an enclosed prism.

In some embodiments, the number of faces may depend on the beam steering range 433 of each antenna. For example, where the beam steering range 433 includes a 90-degree range (e.g., a maximum angle of incidence of 45 degrees relative to the normal incidence), the vertical attachment integrated roofing accessory 431*d* may be configured with four antennas such that where the beam steering range 433 of one antenna ends, the beam steering range 433 of an adjacent antenna begins.

In some embodiments, rather than a prismatic arrangement of faces, the vertical attachment integrated roofing accessory 431*d* may use triangular or trapezoidal faces that are angled downward to the ground, such that the combination of faces form an upside-down pyramid. Such an arrangement of faces directs the beam steering range 433 of each antenna to cover a larger area of the ground, thus increasing effective coverage of the vertical attachment roofing accessory 431*d*. The angle of faces may be selected to balance coverage of the ground with coverage of other structures 40 to communicate with other integrated roofing accessories 11. As such, the faces may be oriented such that the beam steering range 433 may include a vertical limit of the range that extends to an angle above a horizontal that projects over a highest integrated roofing accessory 11 within the signal range of the vertical attachment integrated roofing accessory 431*d*.

In some embodiments, each face of the vertical attachment integrated roofing accessory 431*d* may include an antennae 313 and/or a SDR 31. In some embodiments, electronics components, e . . . g, the MEC 32, compute 332 and storage 331, and optionally the SDR 31, as well as other electronics components, may be housed in an electronics compartment (e.g., electronics compartment 20) in a centralized location relative to the faces and shared amongst all the faces. The electronics compartment may extend vertically above the roof 43, enclosed by the faces of the vertical attachment integrated roofing accessory 431*d*. Thus, processing componentry may be reduced and the vertical attachment integrated roofing accessory 431*d* may be modularized for any number of antennae but only needing one central computing resource hub.

However, the vertical attachment integrated roofing accessory 431*d* may also or alternatively be a combination of multiple integrated roofing accessories 11 configured into a single software defined network 30 to share resources amongst each roofing accessory. Such an arrangement results in fewer individual parts and easy plug-and-play construction of vertical attachment integrated roofing accessories 431*d*, as well as processing and storage redundancy.

Indeed, in some embodiments, the vertical attachment integrated roofing accessory 431*d* may be formed by arranging multiple siding integrated roofing accessories 431*b* or coplanar integrated roofing accessories 431*a* into the prismatic or pyramidal arrangement of faces described above. Similarly, the ridge vent integrated roofing accessory 431*c* may be two or more coplanar integrated roofing accessories 431*a* or siding integrated roofing accessories 431*b* arranged to match the shape of the ridge of the roof. As a result, regardless of which roofing accessory positioning is used, the same integrated roofing accessory 11 parts may be employed, only in different arrangements and positions on the roof 43, reducing a number of models and a number of form factors of integrated roofing accessories 11, and thus reducing manufacturing complexity and cost.

In some embodiments, regardless of the location, each integrated roofing accessory, 431*a*, 431*b*, 431*c* and 431*d*, may be configured to access resources from the structure 40 via the ridge vent. For example, the roofing accessories may include wiring or cabling to connect to mains power, roof mounted solar power, in-structure networking, a hardwire backhaul network (e.g., fiber optic cabling), among other resources routed through the structure 40 via the ridge vent.

Figure 5:
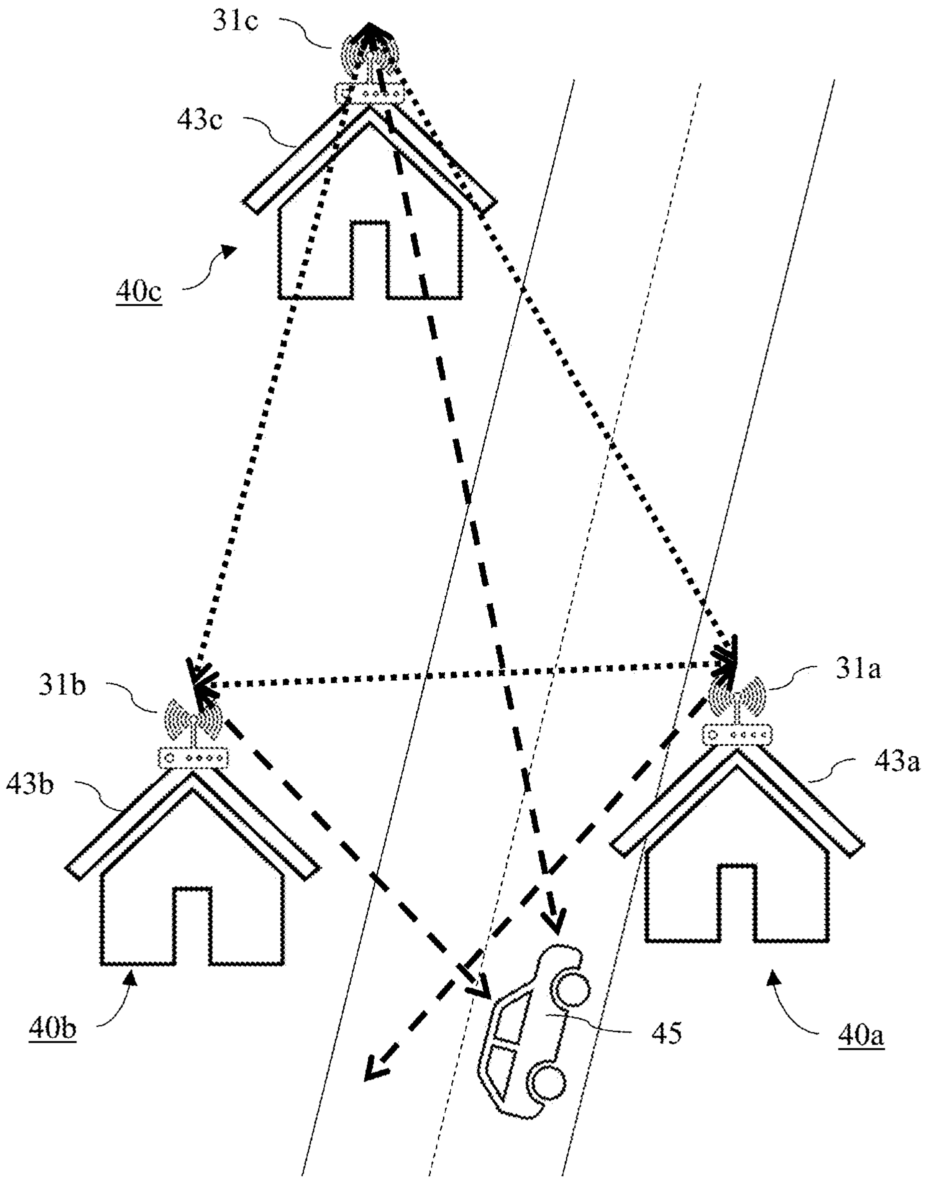
FIG. 5 depicts a non-limiting embodiment depicting integrated roofing accessories of FIG. 1 embedded into various roof locations.

FIG. 5 illustrates an example 5G mesh network using integrated roofing accessories installed on roofs of residential homes according to aspects of embodiments of the present description.

In some embodiments, because 5G signals are directional (see, beamforming described above), antenna placement in an area can affect 5G signal stability and strength because 5G signals may be dependent upon the clearest line of sight for the best possible communication. As such, roof placement for structure-to-structure and the placement on the structure may affect the integrity and strength of the signal.

In some embodiments, each home 40*a*, 40*b* and 40*c* is fitted with a 5G-enabled integrated roofing accessory 31*a*, 31*b*, and 31*c*, respectively. The integrated roofing accessories 31*a*, 31*b*, and 31*c* may provide at least two forms of communication: mesh networking with information sharing by signals between each integrated roofing accessory 31*a*, 31*b*, and 31*c* (denoted with dotted lines); and computing device communication providing 5G signals to a computing device, such as the 5G-enabled vehicle 45 (denoted with dashed lines).

In order to deliver reliable connectivity to a user in the presence of obstacles, a mmWave access point network may be built with redundancies of antennae 31*a* through 31*c*. There may be enough redundancy such that, in the event of LOS blocking, the network connection of the 5G-enabled device can be rapidly rerouted via another (e.g., from antenna 31*a* to antenna 31*b* or 31*c*). In such a mmWave access point network, or mesh network, a cluster of access points (e.g., integrated roofing accessories 31*a*, 31*b*, and 31*c*) may be coordinated to provide uninterrupted connectivity to the 5G-enabled device. By using such a cluster of access points, the network may overcome radio-link blockages due to obstacles.

In some embodiments, mesh networking, or the inter-home communication, supports network administration, maintenance and backhaul communication to the carrier. In some embodiments, each structure or home 40*a*, 40*b* and 40*c* may maintain communication with as many structures as possible in the event a structure goes away or there is a better path back to the carrier. Thus, in some embodiments, data transmission from a computing device back to a backhaul infrastructure may be dynamically managed within the network of 5G-enabled integrated roofing accessories 31*a*, 31*b*, and 31*c*. For example, a primary data connect for the vehicle 45 may be provided by home 40*b* because the integrated roofing accessories 31*b* and 31*c* with line-of-sight (LOS) to the vehicle 45 may communicate with each other to determine that integrated roofing accessory 31*b* has a stronger connection, and thus greater signal strength and signal integrated, resulting in greater speeds, greater stability, and decreased error rates and drop-outs.

As described above, each 5G-enabled device (e.g., vehicle 45, a smartphone, a computer, a WiFi hotspot, among other 5G-enabled devices) in a mmWave network may be served by a cluster of integrated roofing accessories 31*a*, 31*b*, and 31*c*. In some embodiments, the integrated roofing accessories 31*a*, 31*b*, and 31*c* may be selected to be members of the cluster set of a computing device based on which integrated roofing accessories 31*a*, 31*b*, and 31*c* are accessible by the device.

In some embodiments, each integrated roofing accessory 31*a*, 31*b*, and 31*c* may be considered to be accessible if the device can receive a beacon waveform via the integrated roofing accessory 31*a*, 31*b*, and 31*c*. For example, in some embodiments, the mmWave capable integrated roofing accessories 11 may be installed on top of buildings, such as each residential home 40*a*, 40*b* and 40*c*. As a result of the shadowing loss characteristics within the mmWave band, the radio link between a computing device, such as a 5G-enabled vehicle 45, and serving access point, antenna 31*b* and/or antenna 31*c*, will likely be disrupted if the line-of-sight (LOS) between the vehicle 45 and the access point is blocked by obstacles. For example, where the vehicle 45 passes close to another building with another antenna 31*a*, the LOS may be broken by the roof 43*a*, or the antenna 31*a* may not have the angular range to direct a beamformed signal to the location of the vehicle 45. Similarly, when a pedestrian (with a 5G-enabled device) walks along a sidewalk, the pedestrian's LOS may be blocked by fixed obstacles (such as trees), or may be blocked by moving obstacles (such as large trucks), or may be blocked by other pedestrians. In a campus courtyard or a tourist hotspot, LOS blocking may be caused by crowds. Other types of LOS blocking may be caused by user motions, such as by hand or body rotations.

In some embodiments, among the integrated roofing accessories 31*a*, 31*b*, and 31*c*, one particular integrated roofing accessory (e.g., integrated roofing accessory 31*b*) can be selected as the serving integrated roofing accessory 31*b* for the device, e.g., the vehicle 45 to prevent or minimize the blocking and other disruptions. In some embodiments, the vehicle 45 may select the serving integrate roofing accessory, and/or integrated roofing accessories 31*a*, 31*b* or 31*c* in the mesh network may cooperatively identify the serving roofing accessory based on the strength and stability of test signals using, e.g., a beacon waveform. For example, to select the integrated roofing accessory to serve the vehicle 45 or other device, the beacon waveform may be a broadcast beacon or a swept beam beacon, whose reception has a signal-to-noise-ratio (SNR) threshold above a certain threshold or above the beacon waveform of each other integrate roofing accessory 31*a*, 31*b* and 31*c*. Accessibility information of an integrated roofing accessory 31*a*, 31*b*, and 31*c* by a device may indicate the best, e.g., transmit and receive beam weights, the antenna polarization (e.g. horizontal, vertical or circular) and the corresponding signal strengths. The transmit and receive antenna weights having the greatest signal strength and stability may determine the antenna directivity for a multi-element antenna array. The antenna weights can be implemented using either an analog, digital or hybrid implementation. Other implementations of directional antennas could also be supported by this description. For example, a dielectric lens antenna can focus mmWave energy through diffraction similar to how an optical lens focuses light. The antenna directivity of a dielectric lens antenna is controlled by configuring the switching feed elements.

In some embodiments, the beam synchronization may be maintained, e.g., by selecting the best beams for downlink (DL) and uplink (UL) communication with each of the integrated roofing accessories 31*a*, 31*b*, and 31*c* as the vehicle 45 moves physically through the network. Based on signal characteristics, e.g., detected by the integrated roofing accessories 31*a*, 31*b* and 31*c* or the vehicle 45, or both, the servicing integrate roofing accessory may be maintained or changed as shadowing, blockage and distance to the vehicle 45 changes. For example, the serving roofing accessory may be tested for strength and integrity of signal each, e.g., 1 millisecond (ms), 10 ms, 100 ms, 250 ms, 500 ms, 1 second, 5 seconds, 10 seconds, or other testing frequency.

In some embodiments, the maximize the area covered by signals from the integrated roofing accessories 31*a*, 31*b* and 31*c*, the integrated roofing accessories 31*a*, 31*b* and 31*c* may be installed onto the respective roofs 43*a*, 43*b*, and 43*c* in an optimum roofing configuration, such as the configurations described above with reference to FIG. 5. In some embodiments, the vertical configuration 431*d* may provide the greatest angular coverage.

In some embodiments, the mesh network may support backhaul by, e.g., forcing Border Gateway Protocol (BGP). BGP can support fast route switching of large networks. In addition, BGP may function as a routing bridge between 5G wireless, 4G/LTE/5G (lite) and wired networks. However, other suitable routing protocols may be employed instead or in addition.

Figure 6:
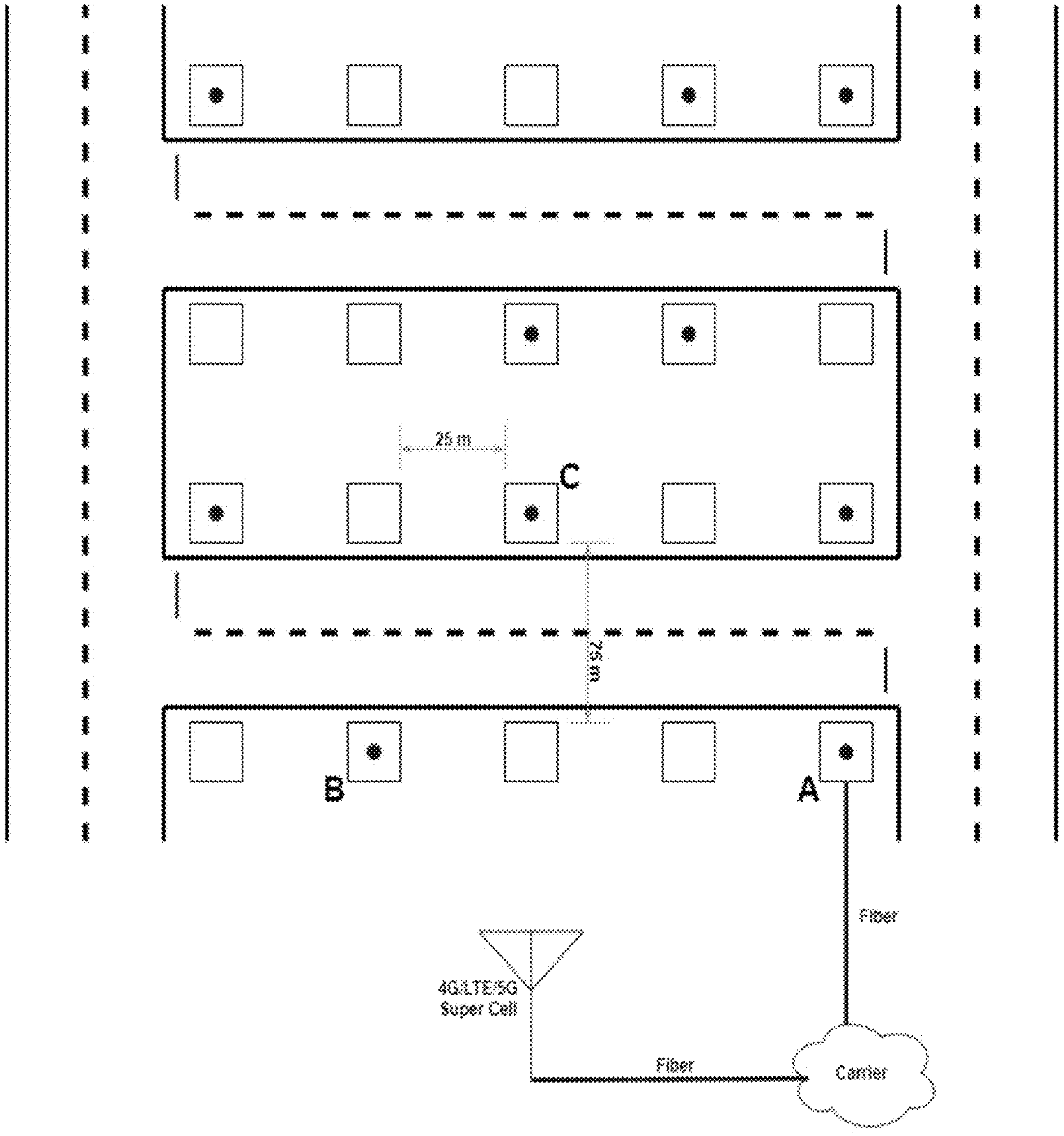
FIG. 6 depicts a non-limiting embodiment depicting an arrangement of the integrated roofing accessories of FIG. 1 across an area for 5G mesh coverage over the whole area.

FIG. 6 depicts a diagram illustrative of embodiments of the present description including a residential neighborhood. Based upon statistics and sampling, roofing material is installed on one of three homes in the United States. The distribution may likely be more or less than 1 of 3. Generally, when roofing tracks are installed a contractor will choose a brand of roofing accessories for the roofing for most properties.

The circles on the homes represent the structures with the integrated roofing accessory 11. At the bottom of the diagram there are two sources of internet access for a 5G Roofing accessory network: Structure-A which is directly connected to fiber back to the carrier and the other, a super cell that connects to Structures A and B via wireless backhaul.

For Structure-A, the primary backhaul and internet access may be provided by the directly connected fiber. Secondary backhaul and internet access will be provided by the wireless supercell. The tertiary network access for Structure-A will come from Structure-B which is wireless connected to the supercell.

Structures-A, B, and C and the other structures with circles represent and participate in the 5G Roofing accessory Mesh network. Each blue dot/structure will have multiple dynamic paths/connection to the carrier network and services, plus the internet.

At least some aspects of the present disclosure will now be described with reference to the following numbered clauses.

Clause 1. A system comprising:

at least one first integrated roofing accessory installed on a first roof, wherein the at least one first integrated roofing accessory comprises:
- i) at least one first transceiver configured to produce millimeter wave (mmWave) frequency signals using at least one fifth generation cellular networking (5G) protocol,
- ii) at least one first dielectric antenna in electrical communication with the at least one first transceiver for emitting the mmWave frequency signals according to the at least one 5G protocol,
- iii) a first edge computing device having at least one first processor and at least one first non-transitory storage with first software to operate the first edge computing device in communication with the at least one first transceiver, and
- iv) at least one first power supply;

at least one second integrated roofing accessory installed on a second roof, wherein the at least one second integrated roofing accessory comprises:
- i) at least one second transceiver configured to produce the mmWave frequency signals using the at least one 5G protocol,
- ii) at least one second dielectric antenna in electrical communication with the at least one second transceiver for emitting the mm Wave frequency signals according to the at least one 5G protocol,
- iii) a second edge computing device having at least one second processor and at least one second non-transitory storage with second software to operate the second edge computing device in communication with the at least one second transceiver, and
- iv) at least one second power supply;

at least one third integrated roofing accessory installed on a third roof, wherein the at least one third integrated roofing accessory comprises:
- i) at least one third transceiver configured to produce the mmWave frequency signals using the at least one 5G protocol,
- ii) at least one third dielectric antenna in electrical communication with the at least one third transceiver for emitting the mmWave frequency signals according to the at least one 5G protocol,
- iii) a third edge computing device having at least one third processor and at least one third non-transitory storage with third software configured to operate the third edge computing device in communication with the at least one third transceiver, and
- iv) at least one third power supply;

wherein the first software, the second software and the third software are configured to cause, when executed, the at least one first integrated roofing accessory, the at least one second integrated roofing accessory and third the plurality of integrated roofing accessories to form a 5G network using the mmWave frequency signals; and wherein at least one of the first software, the second software, and the third software are further configured to cause, when executed, the 5G network to communicate with at least one computing device.

Clause 2. A method comprising:

controlling, by at least one first processor of at least one edge computing device of at least one first integrated roofing accessory, at least one first transceiver to produce millimeter wave (mmWave) frequency signals using at least one fifth generation cellular networking (5G) protocol;

wherein the at least one first integrated roofing accessory is installed on a first roof; controlling, the at least one first transceiver, at least one first dielectric antenna to emit the mmWave frequency signals according to the at least one 5G protocol;

controlling, by at least one second processor of at least one edge computing device of at least one second integrated roofing accessory, at least one second transceiver to produce the mmWave frequency signals using the at least one 5G protocol;

wherein the at least one second integrated roofing accessory is installed on a second roof;

controlling, the at least one second transceiver, at least one second dielectric antenna to emit the mmWave frequency signals according to the at least one 5G protocol;

controlling, by at least one third processor of at least one edge computing device of at least one third integrated roofing accessory, at least one third transceiver to produce the mmWave frequency signals using the at least one 5G protocol;

wherein the at least one third integrated roofing accessory is installed on a third roof;

controlling, the at least one third transceiver, at least one third dielectric antenna to emit the mmWave frequency signals according to the at least one 5G protocol;

producing, by the at least one first processor, the at least one second processor and the at least one third processor, a 5G network using the mmWave frequency signals; and causing the network to communicate, by the at least one first processor, the at least one second processor and the at least one third processor, with at least one computing device.

Clause 3. A method comprising:

obtaining at least one first integrated roofing accessory, comprising:
- i) at least one first transceiver configured to produce millimeter wave (mmWave) frequency signals using at least one fifth generation cellular networking (5G) protocol,
- ii) at least one first dielectric antenna in electrical communication with the at least one first transceiver for emitting the mmWave frequency signals according to the at least one 5G protocol, and
- iii) a first edge computing device having at least one first processor and at least one first non-transitory storage with software;

mounting the at least one first integrated roofing accessory on a first roof;

obtaining at least one second integrated roofing accessory, comprising:
- i) at least one second transceiver configured to produce the mmWave frequency signals using the at least one 5G protocol,
- ii) at least one second dielectric antenna in electrical communication with the at least one second transceiver for emitting the mmWave frequency signals according to the at least one 5G protocol, and iii) a second edge computing device having at least one second processor and at least one second non-transitory storage with software;

mounting the at least one second integrated roofing accessory on a second roof;

obtaining at least one third integrated roofing accessory, comprising:

i) at least one third transceiver configured to produce the mmWave frequency signals using the at least one 5G protocol, ii) at least one third dielectric antenna in electrical communication with the at least one third transceiver for emitting the mmWave frequency signals according to the at least one 5G protocol, and iii) a third edge computing device having at least one third processor and at least one third non-transitory storage with software;

mounting the at least one third integrated roofing accessory on a third roof;

wherein the first software, the second software and the third software are configured to cause, when executed, the at least one first integrated roofing accessory, the at least one second integrated roofing accessory and third the plurality of integrated roofing accessories to form a 5G network using the mmWave frequency signals; and wherein at least one of the first software, the second software, and the third software are further configured to cause, when executed, the 5G network to communicate with at least one computing device.

Clause 4. The systems and methods of clauses 1 through 3, wherein at least one of the at least one first integrated roofing accessory, the at least one second integrated roofing accessory, or the at least one third integrated roofing accessory is integrated into at least one modified photovoltaic module.

Clause 5. The systems and methods of clause 4, wherein the at least one modified photovoltaic module comprises at least one photovoltaic panel.

Clause 6. The systems and methods of clauses 1 through 3, wherein at least one of the at least one first transceiver, the at least one second transceiver, or the at least one third transceiver comprises a software-defined radio module.

Clause 7. The systems and methods of clause 6, wherein the software-defined radio module comprises a virtual firewall.

Clause 8. The systems and methods of clauses 1 through 3, wherein the 5G network is defined according to an Open Systems Interconnection (OSI) model.

Clause 9. The systems and methods of clauses 1 through 3, wherein the at least one first integrated roofing accessory further comprises:

a compartment, holding:

i) the at least one first transceiver, ii) the at least one first dielectric antenna, and iii) the at least one first edge computing device;

wherein a portion of the compartment comprises a roofing material; and a frame connected to the compartment and to the first roof.

Clause 10. The systems and methods of clause 9, wherein the compartment extends vertically above the first roof.

Clause 11. The systems and methods of clause 9, wherein the frame is installed into a ridge vent of the first roof.

Clause 12. The systems and methods of clauses 1 through 3, wherein the at least one first integrated roofing accessory further comprises:

a shingle, holding:

i) the at least one first transceiver, ii) the at least one first dielectric antenna, and iii) the at least one first edge computing device.

Clause 13. The systems and methods of clauses 1 through 3, wherein the at least one first dielectric antenna is a plurality of first dielectric antennas.

Clause 14. The systems and methods of clauses 1 through 3, wherein the at least one first integrated roofing accessory further comprises:

a siding, holding:

i) the at least one first transceiver, ii) the at least one first dielectric antenna, and iii) the at least one first edge computing device.

Clause 15. The systems and methods of clauses 1 through 3, wherein at least one of the first software, the second software, or the third software are further configured to cause, when executed, the 5G network to communicate with at least one customer access radio enabled computing device.

Clause 16. The systems and methods of clause 15, wherein the customer access radio enabled device comprises a WiFi communication module.

Clause 17. The systems and methods of clauses 1 through 3:

wherein the at least one first integrated roofing accessory comprise a first data storage device and a first compute device;

wherein the at least one second integrated roofing accessory comprise a second data storage device and a second compute device;

wherein the at least one third integrated roofing accessory comprise a third data storage device and a third compute device; and wherein the first software, the second software and the third software are configured to cause, when executed, the at least one first integrated roofing accessory, the at least one second integrated roofing accessory and third the plurality of integrated roofing accessories to form a distributed datacenter across the 5G network.

Clause 18. The systems and methods of clauses 1 through 3, further comprising a fiber optic connection between a backhaul network and at least one of the at least one first integrated roofing accessory, the at least one second integrated roofing accessory, or the at least one third integrated roofing accessory.

Clause 19. The systems and methods of clauses 1 through 3, wherein the 5G network is a mesh network.

Clause 20. The systems and methods of clauses 1 through 3, further comprising an array of photovoltaic panels; and wherein at least one of the at least one first integrated roofing accessory, the at least one second integrated roofing accessory, or the at least one third integrated roofing accessory is powered by the array of photovoltaic panels.

Clause 21. The systems and methods of clauses 1 through 3, further comprising a mains power connection via a ridge vent; and wherein at least one of the at least one first integrated roofing accessory, the at least one second integrated roofing accessory, or the at least one third integrated roofing accessory is powered by the mains power connection.

At least some aspects of the present disclosure will now be described with reference to the following additional numbered clauses.

Clause 1. A system comprising:

a first plurality of integrated roofing accessories installed on a first roof, wherein the first plurality of integrated roofing accessories comprise:

i) at least one first transceiver configured to produce millimeter wave (mmWave) frequency signals using at least one fifth generation cellular networking (5G) protocol, ii) at least one first dielectric antenna in electrical communication with the at least one first transceiver for emitting the mmWave frequency signals according to the at least one 5G protocol, iii) a first edge computing device having at least one first processor and at least one first non-transitory storage with first software to operate the first edge computing device in communication with the at least one first transceiver, and iv) at least one first power supply;

a second plurality of integrated roofing accessories installed on a second roof, wherein the second plurality of integrated roofing accessories comprise:

i) at least one second transceiver configured to produce the mmWave frequency signals using the at least one 5G protocol, ii) at least one second dielectric antenna in electrical communication with the at least one second transceiver for emitting the mmWave frequency signals according to the at least one 5G protocol, iii) a second edge computing device having at least one second processor and at least one second non-transitory storage with second software to operate the second edge computing device in communication with the at least one second transceiver, and iv) at least one second power supply;

a third plurality of integrated roofing accessories installed on a third roof, wherein the third plurality of integrated roofing accessories comprise:

i) at least one third transceiver configured to produce the mmWave frequency signals using the at least one 5G protocol, ii) at least one third dielectric antenna in electrical communication with the at least one third transceiver for emitting the mmWave frequency signals according to the at least one 5G protocol, iii) a third edge computing device having at least one third processor and at least one third non-transitory storage with third software configured to operate the third edge computing device in communication with the at least one third transceiver, and iv) at least one third power supply;

wherein the first software, the second software and the third software are configured to cause, when executed, the first plurality of integrated roofing accessories, the second plurality of integrated roofing accessories and third the plurality of integrated roofing accessories to form a computer network using the mmWave frequency signals; and wherein at least one of the first software, the second software, and the third software are further configured to cause, when executed, the computer network to communicate with at least one computing device.

Clause 2. A method comprising:

controlling, by at least one first processor of at least one edge computing device of at least one first plurality of integrated roofing accessories, at least one first transceiver to produce millimeter wave (mmWave) frequency signals using at least one fifth generation cellular networking (5G) protocol;

wherein the first plurality of integrated roofing accessories are installed on a first roof;

controlling, the at least one first transceiver, at least one first dielectric antenna to emit the mmWave frequency signals according to the at least one 5G protocol;

controlling, by at least one second processor of at least one edge computing device of at least one second plurality of integrated roofing accessories, at least one second transceiver to produce the mmWave frequency signals using the at least one 5G protocol;

wherein the second plurality of integrated roofing accessories are installed on a second roof;

controlling, the at least one second transceiver, at least one second dielectric antenna to emit the mmWave frequency signals according to the at least one 5G protocol;

controlling, by at least one third processor of at least one edge computing device of at least one third plurality of integrated roofing accessories, at least one third transceiver to produce the mmWave frequency signals using the at least one 5G protocol;

wherein the third plurality of integrated roofing accessories are installed on a third roof;

controlling, the at least one third transceiver, at least one third dielectric antenna to emit the mmWave frequency signals according to the at least one 5G protocol;

producing, by the at least one first processor, the at least one second processor and the at least one third processor, a computer network using the mmWave frequency signals; and causing the network to communicate, by the at least one first processor, the at least one second processor and the at least one third processor, with at least one computing device.

Clause 3. A method comprising:

obtaining a first plurality of integrated roofing accessories, comprising:

i) at least one first transceiver configured to produce millimeter wave (mmWave) frequency signals using at least one fifth generation cellular networking (5G) protocol, ii) at least one first dielectric antenna in electrical communication with the at least one first transceiver for emitting the mmWave frequency signals according to the at least one 5G protocol, and iii) a first edge computing device having at least one first processor and at least one first non-transitory storage with software;

mounting the first plurality of integrated roofing accessories on a first roof;

obtaining a second plurality of integrated roofing accessories, comprising:

i) at least one second transceiver configured to produce the mmWave frequency signals using the at least one 5G protocol, ii) at least one second dielectric antenna in electrical communication with the at least one second transceiver for emitting the mm Wave frequency signals according to the at least one 5G protocol, and iii) a second edge computing device having at least one second processor and at least one second non-transitory storage with software;

mounting the second plurality of integrated roofing accessories on a second roof;

obtaining a third plurality of integrated roofing accessories, comprising:

i) at least one third transceiver configured to produce the mmWave frequency signals using the at least one 5G protocol, ii) at least one third dielectric antenna in electrical communication with the at least one third transceiver for emitting the mmWave frequency signals according to the at least one 5G protocol, and iii) a third edge computing device having at least one third processor and at least one third non-transitory storage with software;

mounting the third plurality of integrated roofing accessories on a third roof;

wherein the first software, the second software and the third software are configured to cause, when executed, the first plurality of integrated roofing accessories, the second plurality of integrated roofing accessories and third the plurality of integrated roofing accessories to form a computer network using the mmWave frequency signals; and wherein at least one of the first software, the second software, and the third software are further configured to cause, when executed, the computer network to communicate with at least one computing device.

Clause 4. The systems and methods of clauses 1 through 3, wherein at least one of the first plurality of integrated roofing accessories, the second plurality of integrated roofing accessories, or the third plurality of integrated roofing accessories is integrated into at least one modified photovoltaic module.

Clause 5. The systems and methods of clause 4, wherein the at least one modified photovoltaic module comprises at least one photovoltaic panel.

Clause 6. The systems and methods of clauses 1 through 3, wherein at least one of the at least one first transceiver, the at least one second transceiver, or the at least one third transceiver comprises a software-defined radio module.

Clause 7. The systems and methods of clause 6, wherein the software-defined radio module comprises a virtual firewall.

Clause 8. The systems and methods of clauses 1 through 3, wherein the computer network is defined according to an Open Systems Interconnection (OSI) model.

Clause 9. The systems and methods of clauses 1 through 3, wherein the first plurality of integrated roofing accessories further comprises:

a compartment, holding:

i) the at least one first transceiver, ii) the at least one first dielectric antenna, and iii) the at least one first edge computing device;

wherein a portion of the compartment comprises a roofing material; and a frame connected to the compartment and to the first roof.

Clause 10. The systems and methods of clause 9, wherein the compartment extends vertically above the first roof.

Clause 11. The systems and methods of clause 9, wherein the frame is installed into a ridge vent of the first roof.

Clause 12. The systems and methods of clauses 1 through 3, wherein at least one integrated roofing accessory of the first plurality of integrated roofing accessories further comprises:

a shingle, holding:

i) the at least one first transceiver, ii) the at least one first dielectric antenna, and iii) the at least one first edge computing device.

Clause 13. The systems and methods of clauses 1 through 3, wherein the at least one first dielectric antenna is a plurality of first dielectric antennas.

Clause 14. The systems and methods of clauses 1 through 3, wherein at least one integrated roofing accessory of the first plurality of integrated roofing accessories further comprises:

a siding, holding:

i) the at least one first transceiver, ii) the at least one first dielectric antenna, and iii) the at least one first edge computing device.

Clause 15. The systems and methods of clauses 1 through 3, wherein at least one of the first software, the second software, or the third software are further configured to cause, when executed, the computer network to communicate with at least one customer access radio enabled computing device.

Clause 16. The systems and methods of clause 15, wherein the customer access radio enabled device comprises a WiFi communication module.

Clause 17. The systems and methods of clauses 1 through 3:

wherein the first plurality of integrated roofing accessories comprise a first data storage device and a first compute device;

wherein the second plurality of integrated roofing accessories comprise a second data storage device and a second compute device;

wherein the third plurality of integrated roofing accessories comprise a third data storage device and a third compute device; and wherein the first software, the second software and the third software are configured to cause, when executed, the first plurality of integrated roofing accessories, the second plurality of integrated roofing accessories and third the plurality of integrated roofing accessories to form a distributed datacenter across the computer network.

Clause 18. The systems and methods of clauses 1 through 3, further comprising a fiber optic connection between a backhaul network and at least one of the first plurality of integrated roofing accessories, the second plurality of integrated roofing accessories, or the third plurality of integrated roofing accessories.

Clause 19. The systems and methods of clauses 1 through 3, wherein the computer network is a mesh network.

Clause 20. The systems and methods of clauses 1 through 3, further comprising an array of photovoltaic panels; and wherein at least one of the first plurality of integrated roofing accessories, the second plurality of integrated roofing accessories, or the third plurality of integrated roofing accessories is powered by the array of photovoltaic panels.

Clause 21. The systems and methods of clauses 1 through 3, further comprising a mains power connection via a ridge vent; and wherein at least one of the first plurality of integrated roofing accessories, the second plurality of integrated roofing accessories, or the third plurality of integrated roofing accessories is powered by the mains power connection.

While several embodiments of the present disclosure have been described, these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A system comprising:
an integrated roofing accessory installed on a roof of a home, the integrated roofing accessory comprising:
a roofing accessory,
at least one transceiver integrated into the roofing accessory for exchanging data with at least one backhaul network via electromagnetic communication signals according to at least one electromagnetic communication protocol, and
at least one antenna integrated into the roofing accessory, the at least one antenna being configured to emit, receive or emit and receive the electromagnetic communication signals with the at least one backhaul network; and
wherein the integrated roofing accessory is integrated into at least one modified photovoltaic module;
a customer access radio in communication with the at least one transceiver;
wherein the customer access radio is configured to exchange the data with at least one client device using the electromagnetic communication signals according to the at least one electromagnetic communication protocol.

2. The system of claim 1, wherein the at least one transceiver-comprises a software-defined radio module.

3. The system of claim 1, wherein the integrated roofing accessory further comprises:
a compartment, holding:
the at least one transceiver,
the at least one antenna;
wherein a portion of the compartment comprises a roofing material; and
a frame connected to the compartment and to the roof.

4. The system of claim 3, wherein the frame is installed into a ridge vent of the roof.

5. The system of claim 1, wherein the integrated roofing accessory further comprises:
a shingle, holding:
the at least one transceiver,
the at least one antenna.

6. The system of claim 1, wherein the integrated roofing accessory further comprises:
a siding, holding:
the at least one transceiver,
the at least one antenna.

7. The system of claim 1, wherein the customer access radio is further configured to cause, when executed, the electromagnetic communication network to communicate with at least one customer access radio enabled computing device.

8. The system of claim 7, wherein the customer access radio enabled device comprises a WiFi communication module.

9. The system of claim 1:
wherein the integrated roofing accessory comprises a data storage device and a compute device;
wherein the customer access radio is configured to cause, when executed, the integrated roofing accessory to form a distributed datacenter across the electromagnetic communication network.

10. A system comprising:
an integrated roofing accessory installed on a roof of a home, the integrated roofing accessory comprising:
a roofing accessory,
at least one transceiver integrated into the roofing accessory for exchanging data with at least one backhaul network via electromagnetic communication signals according to at least one electromagnetic communication protocol, and
at least one antenna integrated into the roofing accessory, the at least one antenna being configured to emit, receive or emit and receive the electromagnetic communication signals with the at least one backhaul network; and
a compartment, holding:
the at least one transceiver,
the at least one antenna;
wherein a portion of the compartment comprises a roofing material; and
a frame connected to the compartment and to the roof, wherein the frame is installed into a ridge vent of the roof;
a customer access radio in communication with the at least one transceiver;
wherein the customer access radio is configured to exchange the data with at least one client device using the electromagnetic communication signals according to the at least one electromagnetic communication protocol.

11. The system of claim 10, wherein the at least one transceiver-comprises a software-defined radio module.

12. The system of claim 10, wherein the customer access radio is further configured to cause, when executed, the electromagnetic communication network to communicate with at least one customer access radio enabled computing device.

13. The system of claim 12, wherein the customer access radio enabled device comprises a WiFi communication module.

14. The system of claim 10:
wherein the integrated roofing accessory comprises a data storage device and a compute device;
wherein the customer access radio is configured to cause, when executed, the integrated roofing accessory to form a distributed datacenter across the electromagnetic communication network.

15. A system comprising:
an integrated roofing accessory installed on a roof of a home, the integrated roofing accessory comprising:
a roofing accessory,
at least one transceiver integrated into the roofing accessory for exchanging data with at least one backhaul network via electromagnetic communication signals according to at least one electromagnetic communication protocol, and
at least one antenna integrated into the roofing accessory, the at least one antenna being configured to emit, receive or emit and receive the electromagnetic communication signals with the at least one backhaul network; and
a shingle, holding:
the at least one transceiver,
the at least one antenna,
a customer access radio in communication with the at least one transceiver;
wherein the customer access radio is configured to exchange the data with at least one client device using the electromagnetic communication signals according to the at least one electromagnetic communication protocol.

16. The system of claim 15, wherein the at least one transceiver-comprises a software-defined radio module.

17. The system of claim 15, wherein a compartment, holding:

the at least one transceiver, the at least one antenna;

wherein a portion of the compartment comprises a roofing material.

18. The system of claim 15, wherein the customer access radio is further configured to cause, when executed, the electromagnetic communication network to communicate with at least one customer access radio enabled computing device.

19. The system of claim 18, wherein the customer access radio enabled device comprises a WiFi communication module.

20. The system of claim 15:

wherein the integrated roofing accessory comprises a data storage device and a compute device;

wherein the customer access radio is configured to cause, when executed, the integrated roofing accessory to form a distributed datacenter across the electromagnetic communication network.

* * * * *